(12) United States Patent
Jrad et al.

(10) Patent No.: US 7,603,259 B2
(45) Date of Patent: Oct. 13, 2009

(54) METHOD AND APPARATUS FOR QUANTIFYING AN IMPACT OF A DISASTER ON A NETWORK

(75) Inventors: Ahmad M. Jrad, Red Bank, NJ (US);
Blesson Mathews, Marlboro, NJ (US);
Thomas B. Morawski, Westfield, NJ (US); Louise F. A. Spergel, Washington Crossing, PA (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 546 days.

(21) Appl. No.: 11/238,919

(22) Filed: Sep. 29, 2005

(65) Prior Publication Data
US 2007/0005680 A1    Jan. 4, 2007

Related U.S. Application Data

(60) Provisional application No. 60/689,173, filed on Jun. 10, 2005.

(51) Int. Cl.
*G06F 7/60* (2006.01)

(52) U.S. Cl. .......................................... 703/2

(58) Field of Classification Search ............... 703/2, 703/21
See application file for complete search history.

(56) References Cited

U.S. PATENT DOCUMENTS

| 6,088,804 | A * | 7/2000 | Hill et al. ................. 726/25 |
| 6,442,694 | B1 * | 8/2002 | Bergman et al. ........... 726/22 |
| 6,917,816 | B2 * | 7/2005 | Abed et al. ............. 455/556.1 |
| 2004/0236676 | A1 * | 11/2004 | Takezawa et al. ........... 705/38 |

* cited by examiner

*Primary Examiner*—Paul L Rodriguez
*Assistant Examiner*—Juan C Ochoa

(57) ABSTRACT

The invention comprises a method and apparatus for determining an expected impact of a disaster on a network. In particular, one embodiment of the method includes modeling the network as a plurality of geographical regions associated with respective pluralities of network elements and network element interconnectivities, generating a disaster model associated with the disaster by adjusting a disaster framework using a disaster parameter, generating a disaster analysis model using the network model and the disaster model, wherein the disaster analysis model includes a disaster probability parameter and a disaster impact parameter, and determining the expected impact of the disaster on at least a portion of the network using the disaster analysis model.

27 Claims, 9 Drawing Sheets

400

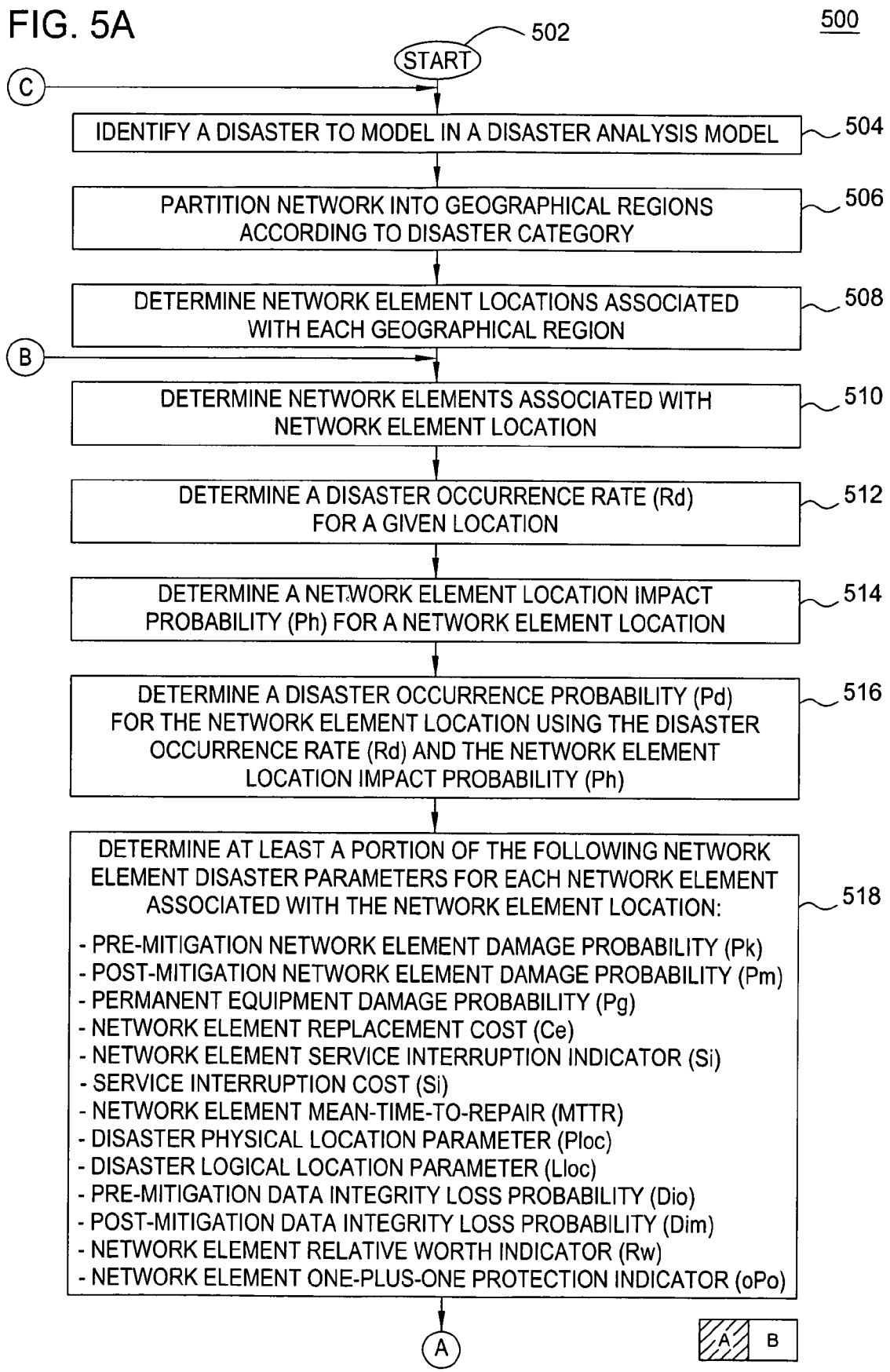

METHOD AND APPARATUS FOR QUANTIFYING AN IMPACT OF A DISASTER ON A NETWORK

CROSS-REFERENCE TO RELATED APPLICATIONS

The present application claims the benefit of U.S. Provisional Application Ser. No. 60/689,173, entitled "Business Continuity & Disaster Preparedness Readiness Model,", filed Jun. 10, 2005, which is incorporated herein by reference in its entirety.

FIELD OF INVENTION

The invention relates to the field of communication networks, and, more specifically, to quantifying the impact of disasters on communications networks.

DESCRIPTION OF THE BACKGROUND ART

A high degree of network reliability is important to most communications services customers and, therefore, to communications service providers. In order to assess network reliability, service providers have developed models for identifying potential risks to network reliability. Traditional network reliability models were typically designed from the perspective of equipment manufacturers, e.g., by analyzing network element hardware, firmware, and software failures. More recently, service providers have begun examining the vulnerability of communications networks to disaster events, e.g., hurricanes, floods, terrorism, and the like. In particular, service providers have developed business continuity disaster planning (BCDP) techniques for examining the vulnerability of communication networks to the disaster events.

The existing BCDP techniques use qualitative analyses to assess a communication service provider's level of disaster preparedness. For example, service provider networks and associated processes may be analyzed using on-site building inspections, questionnaires, disaster preparedness drills, and the like. In particular, using the existing BCDP techniques, service providers analyze disasters by looking for single points of failure in the network. For example, a service provider may determine that the failure of a particular network element would result in a large number of customer connections being dropped. The service provider's level of disaster preparedness is then improved by providing network redundancy for the identified single points of failure. Due to the complicated nature of both communications networks and disaster events, however, such BCDP techniques are simply not effective.

A current technique for analyzing a service provider's disaster preparedness is the Availability Environment Classifications (AECs) method proposed by the Harvard Research Group (HRG). In the AEC method, a number of server availability classes are defined. In particular, the AEC server availability classes are defined to provide indications with respect to the tolerable length of server downtime and associated server data loss. The AEC method, however, does not specify the method by which the availability class of a server or function is determined. As such, existing techniques for analyzing a service provider's network for assessing the service provider's level of disaster preparedness are inadequate.

SUMMARY OF THE INVENTION

The disadvantages heretofore associated with the prior art are overcome by the present invention of a method and apparatus for analyzing the impact of a disaster on a communications network. The impact of a disaster on a communications network is analyzed by generating a disaster analysis model for a disaster and using the disaster analysis model for determining the expected impact of the disaster on at least a portion of the communications network. The disaster analysis model is generated by modeling the communications network and modeling the disaster. The disaster analysis model quantifies the expected impact of a disaster on a communications network. The disaster analysis model includes disaster probability parameters indicative of the likelihood of a disaster event and disaster impact parameters indicative of the likely impact of the disaster event.

In general, an expected impact includes such measures as length of service interruption, disaster costs in terms of equipment damage, lost revenue, financial penalties arising from service level agreement (SLA) violations, and the like. The expected impact is determined for various network scopes, e.g., per network element, per geographic location, per network element location, per network service, for portions of the network, for the entire communications network, and for various other network scopes. The expected impact of a disaster on a communications network is quantified using a disaster analysis model. The disaster analysis model is generated by modeling the communications network using a network model and modeling various disasters using associated disaster models.

The network model represents the communications network according to geographical regions. A geographical region may an area of any shape or size, where shape and size depend on the disaster being analyzed. For example, the geographical area modeled for a flood may include all portions of a valley located below a dam.

The models of the geographical regions include geographical characteristics associated with each of the geographical regions. For example, geographical characteristics may include proximity to bodies of water, e.g., for floods, proximity to regions historically impacted by hurricanes, e.g., for hurricanes, proximity to regions historically impacted by tornados, e.g., for tornados, proximity to fault lines, e.g., for earthquakes, location in a region served by a particular power grid, e.g., for power outages, proximity to nuclear power plants, e.g., for terrorism, and like geographical characteristics associated with modeling various other disasters. As such, the geographical characteristics included in the network model may vary depending on the disaster being analyzed.

The geographical regions include network element locations. A network element location includes at least one network element. For example, depending on the geographical region, a network element location may be a city, a city block, a building, a floor of a building, a specific portion of a floor of a building, and the like, depending on the disaster being analyzed. A network element location includes network element location characteristics. The network element location characteristics may be used for tailoring the analysis of the impact of the disaster on the geographical region such that the accuracy of the analysis of the impact of the disaster is improved at a network element location granularity. In one embodiment, a geographical region is defined in terms of the associated network element locations.

The network model includes connectivity information defining physical connectivity between network elements and connectivity information defining logical connectivity between network elements, i.e., collectively denoted as connectivity information. The connectivity information is used for determining intra-region disaster impacts, i.e., the impact of the occurrence of a disaster in a first network element location on a second network element location in that geographical region. The connectivity information is used for determining inter-region impacts, i.e., the impact of the occurrence of a disaster in a first geographical region on a second geographical region of the communications network.

The disaster model represents various disasters according to a disaster framework and associated disaster parameters. The disaster framework, e.g., a Poisson model representing a particular category of disasters, is selected according to the disaster category of the disaster under analysis, e.g., whether the disaster is a natural disaster, a technical disaster, or a human disaster. For example, disaster types in the natural disaster category include earthquakes, tornados, floods, and the like, disaster types in the technical disaster category include power failures, gas leaks, and the like, and disaster types in the human disaster category include terrorism, vandalism, and the like. The disaster model is generated by adjusting the disaster framework. In one embodiment, the selected disaster framework is adjusted according to disaster characteristics specific to the disaster under analysis.

The network and disaster models are combined to produce a disaster analysis model. The disaster analysis model includes disaster probability parameters for quantifying the likelihood of different disasters impacting various portions of the communications network. For example, some disaster probability parameters include the rate of occurrence of a given disaster in a given location, the probability that if the given disaster strikes the given location that the location of the network element, e.g., a building in which a router is located, is impacted by the disaster, and like disaster probability parameters. The disaster analysis model also includes disaster impact parameters for quantifying the impact of different disasters on various network scopes, e.g., on a network element, on a network element location, on a network service, and like network scopes. For example, some disaster impact parameters include the cost to replace damaged network elements, the cost of interruption to a service, e.g., lost revenue, service level agreement penalties, and the like, and like disaster impact parameters.

The disaster analysis model is used to determine the expected impact of a disaster on the network. In particular, combinations of disaster probability parameters and disaster impact parameters are used to quantify the impact of disasters on various portions of the communications network. In one embodiment, the disaster analysis model is used for assessing the value of possible disaster mitigation actions that may be performed by a service provider to decrease the impact of different disasters on the network. In one such embodiment, pre-mitigation and post-mitigation expected impact parameters are determined using the disaster analysis model. A cost-benefit analysis of the possible disaster mitigation actions is then performed by comparing the pre-mitigation and post-mitigation expected impact parameters to assess the value of implementing the disaster mitigation actions on different portions of the communications network.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

Figure 1:
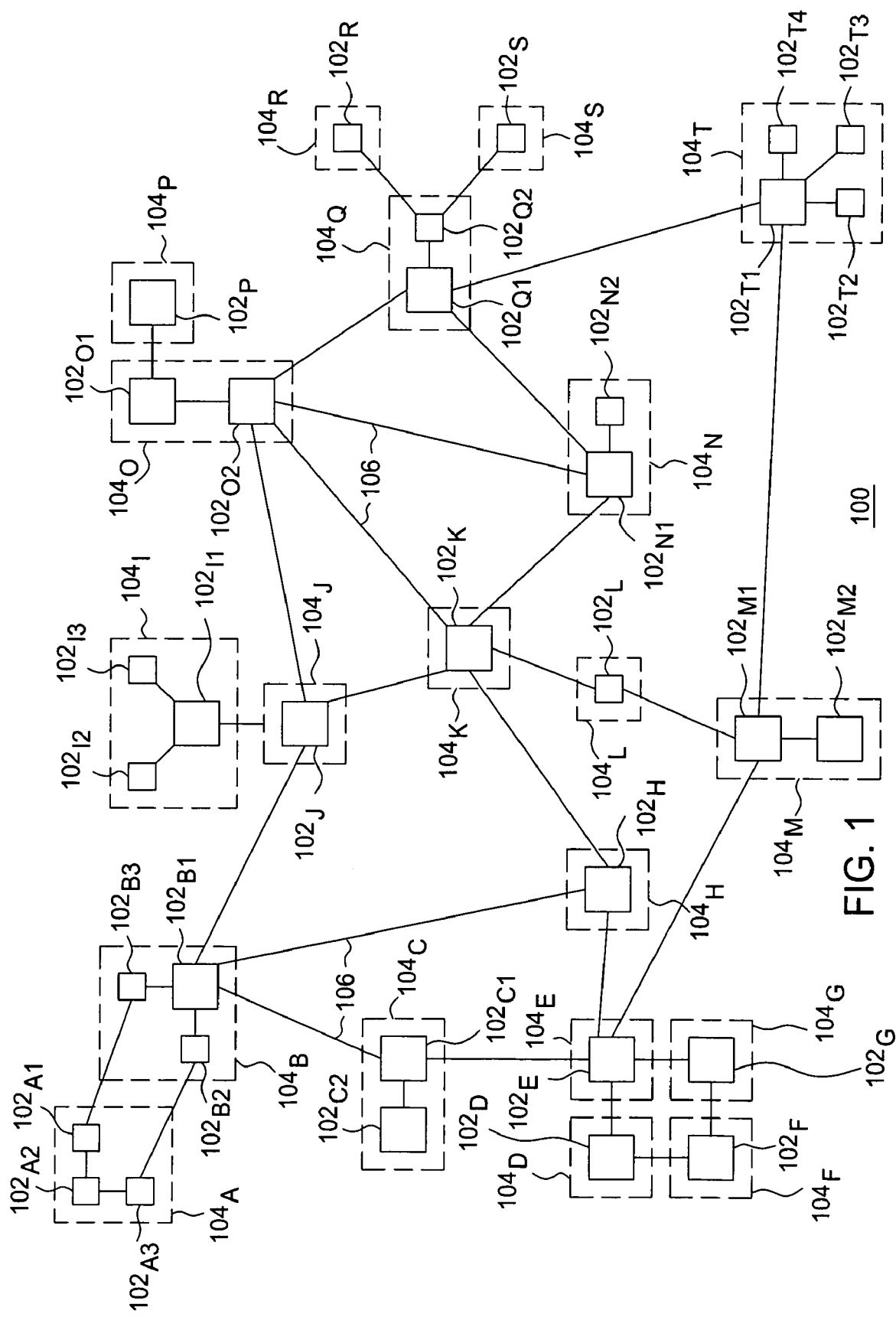
FIG. 1 depicts a high-level block diagram of a communications network.

In general, the present invention is a method for determining the expected impact of disasters on a communications network. The present invention determines the probability of any number of disaster strikes on at least a portion of a network, and the impact of such disaster strikes on at least a portion of the network. In one embodiment, the impact of a disaster strike is determined for at least one of an individual network element, a group of network elements, a service (i.e., each network element required to provide a particular network service), each network element associated with a network element location, a network element location, each network element associated with a plurality of network element locations, a plurality of network element locations, each network element associated with a geographical region, a geographical region, each network element associated with a plurality of geographical regions, a plurality of geographical regions, the entire network, and the like, as well as various combinations thereof.

In one embodiment, the determination of the expected impact of a disaster on the communications network is performed using a disaster analysis model. The disaster analysis model combines network models and disaster models in order to quantify the expected impact of various disasters on various portions of the communications network. In one embodiment, combination of network models and disaster models in order to create a disaster analysis model is performed by associating parameters of the network models with parameters of the disaster models. In one further embodiment, association of the parameters of network models with the parameters of disaster models is performed using disaster probability parameters and disaster impact parameters. In one further embodiment, association of the parameters of network models with the parameters of disaster models using disaster probability parameters and disaster impact parameters is performed using at least one disaster analysis matrix.

In general, the communications network is modeled as a network model. In one embodiment, the communications network is modeled using the characteristics of the network elements, including the respective geographical regions of the network elements and associated geographical characteristics, and the logical connectivity between the network elements. In one embodiment, the modeling of geographical regions may be performed using longitude and latitude specifications, e.g., the boundary of a geographical region may be defined using pairs of latitude-longitude values. In one embodiment, the communications network is modeled using a Markov modeling technique. In one embodiment, the communications network is modeled using at least one call-path flow model including the network elements required to complete at least one communication transaction as per the service being considered. In one such embodiment, the baseline reliability of the of the call-path flow of the communications network is modeled using a Markov modeling technique.

In general, the disasters are modeled as respective disaster models. In one embodiment of disaster modeling, disasters are grouped into disaster categories. In one embodiment, the disaster categories include natural disasters, technical disasters, human disasters (i.e., deliberate disasters), and the like. The disaster categories include associated disaster types. A natural disaster may include at least one of a hurricane, a tornado, a tsunami, an earthquake, a volcanic eruption, an avalanche, a typhoon, a flood, a wildfire, and like natural disaster types, as well as various combinations thereof. A technical disaster may include at least one of a power failure, a gas leak, a radioactive material leak, an accidental building fire, an accidental explosion, and like technical disaster types, as well as various combinations thereof. A human disaster may include at least one of a terrorist attack, vandalism, a disgruntled employee attack, a cyber attack, and like human disaster types, as well as various combinations thereof.

In one embodiment, disasters are modeled using a disaster framework. In one embodiment, disasters are modeled as independent events. In one further embodiment, disasters are modeled as independent events using a Poisson process. In this embodiment, the Poisson process is the disaster framework. In one embodiment, generation of a disaster model includes, selecting the disaster framework according to a disaster type associated with the disaster, determining at least one disaster detail parameter associated with the disaster, and adjusting the disaster framework using the at least one disaster detail parameter to produce the disaster model. In one embodiment, the at least one disaster parameter comprises at least one disaster statistic associated with the disaster type.

The network models and disaster models are combined with financial information about network costs, e.g., network element replacement costs, and network revenue, e.g., revenue lost due to service interruptions, in order to determine various expected impact parameters for quantifying the expected impact of different disasters on the communications network. As such, while previous disaster analysis focused on identifying single point-of-failures in the network, the present invention quantifies the risk of a disaster and the associated expected impact of the disaster on the network according to the probability of disaster occurrence, the probability of the disaster affecting a specific part of the network, and like parameters.

In accordance with the present invention, the network models, disaster models, and disaster analysis model may be used for quantifying the likelihood of a particular disaster impacting a specific portion of the communications network, as well as the financial impact of the disaster on the communications network. For example, in one embodiment, disaster cost quantification is broken down into an expected repair-cost portion and an expected lost revenue portion. In one embodiment, the expected repair-cost portion includes the cost to repair or replace damaged network equipment and facilities. In one embodiment, the expected lost revenue portion includes the expected lost revenue due to network downtime. Furthermore, in accordance with the present invention, the network models, disaster models, and disaster analysis models may be used for quantifying the benefits of various proposed disaster mitigation solutions. Thus, the present invention enables a network operator to perform a cost-benefit analysis in order to determine the best options for preparing the network for various different disasters within a finite budget.

FIG. 1 depicts a high-level block diagram of a communications network. Specifically, communications network 100 of FIG. 1 includes a plurality of network elements (NEs) $102_A$-$102_T$ (collectively, NEs 102), where each of the NEs 102 is located within one of a plurality of network element locations (NELs) $104_A$-$104_T$ (collectively, NELs 104). The NEs 102 in NELs 104 communicate using a plurality of communication links (CLs) 106 (collectively, CLs 106). In one embodiment, each of the NELs 104 is a physical location housing at least one associated NE 102.

As depicted in FIG. 1, NEL $104_A$ includes a plurality of NEs $102_{A1}$-$102_{A3}$ (collectively, NEs $102_A$), NEL $104_B$ includes a plurality of NEs $102_{B1}$-$102_{B3}$ collectively, NEs $102_B$), NEL $104_C$ includes a plurality of NEs $102_{C1}$-$102_{C2}$ (collectively, NEs $102_C$), NEL $104_D$ includes NE $102_D$, NEL $104_E$ includes NE $102_E$, NEL $104_F$ includes NE $102_F$, NEL $104_G$ includes NE $102_G$, NEL $104_H$ includes NE $102_H$, NEL $104_I$ includes a plurality of NEs $102_{I1}$-$102_{I3}$ (collectively, NEs $102_I$), NEL $104_J$ includes NE $102_J$, NEL $104_K$ includes NE $102_K$, NEL $104_L$ includes NE $102_L$, NEL $104_M$ includes a plurality of NEs $102_{M1}$-$102_{M2}$ (collectively, NEs $102_M$), NEL $104_N$ includes a plurality of NEs $102_{N1}$-$102_{N2}$ (collectively, NEs $102_N$), NEL $104_O$ includes a plurality of NEs $102_{O1}$-$102_{O2}$ (collectively, NEs $102_O$), NEL $104_P$ includes a plurality of NEs $102_{P1}$-$102_{P2}$ (collectively, NEs $102_P$), NEL $104_Q$ includes a plurality of NEs $102_{Q1}$-$102_{Q2}$ (collectively, NEs $102_Q$), NEL $104_R$ includes NE $102_R$, NEL $104_S$ includes NE $102_S$, NEL $104_T$ includes a plurality of NEs $102_{T1}$-$102_{T4}$ (collectively, NEs $102_T$). The NEs $102_A$-$102_T$ are collectively denoted as NEs 102.

In accordance with the present invention, the communications network for which an expected impact of various disasters is determined may include any communications network. As such, communications network 100 of FIG. 1 may comprise at least one of a Public Switched Telephone Network (PSTN), an Internet Protocol (IP) network, an Asynchronous Transfer Mode (ATM) network, a Frame Relay (FR) network, an Ethernet network, an optical transport network (OTN), a synchronous optical network (SONET), a wireless network, a cable network, and the like, as well as various combinations thereof. As such, NEs 102 depicted and described herein with respect to communications network 100 of FIG. 1 may comprise any network elements, such as switches, routers, mobile switching centers, network databases, cross-connect systems, optical switches, cable head-end modems, cable head-ends, cable modem termination systems, add-drop multiplexers, home location registers, base stations, mobile switching centers, and the like, as well as various combinations thereof depending on the type(s) of network(s) modeled according to the present invention.

Although not depicted as overlaying a map (e.g., a political map, a geographical map, a geopolitical map, and the like), in one embodiment, in which communications network 100 is displayed on a user interface, communications network 100 may overlay such a map. In one such embodiment, at least a portion of the features of the map may be used in generating at least a portion of the disaster analysis model, including parameters of the disaster analysis model. For example, proximity of particular NELs to a river may impact disaster analysis processing according to the present invention for a flood disaster. Similarly, for example, proximity of particular NELs to an oceanic coastline may impact disaster analysis processing for hurricane, tsunami, flood, and like disasters. In one embodiment, such geographical features, political borders, and like features may be used in generating disaster analysis model parameters independent of the display of communications network 100 on a user interface.

Figure 2:
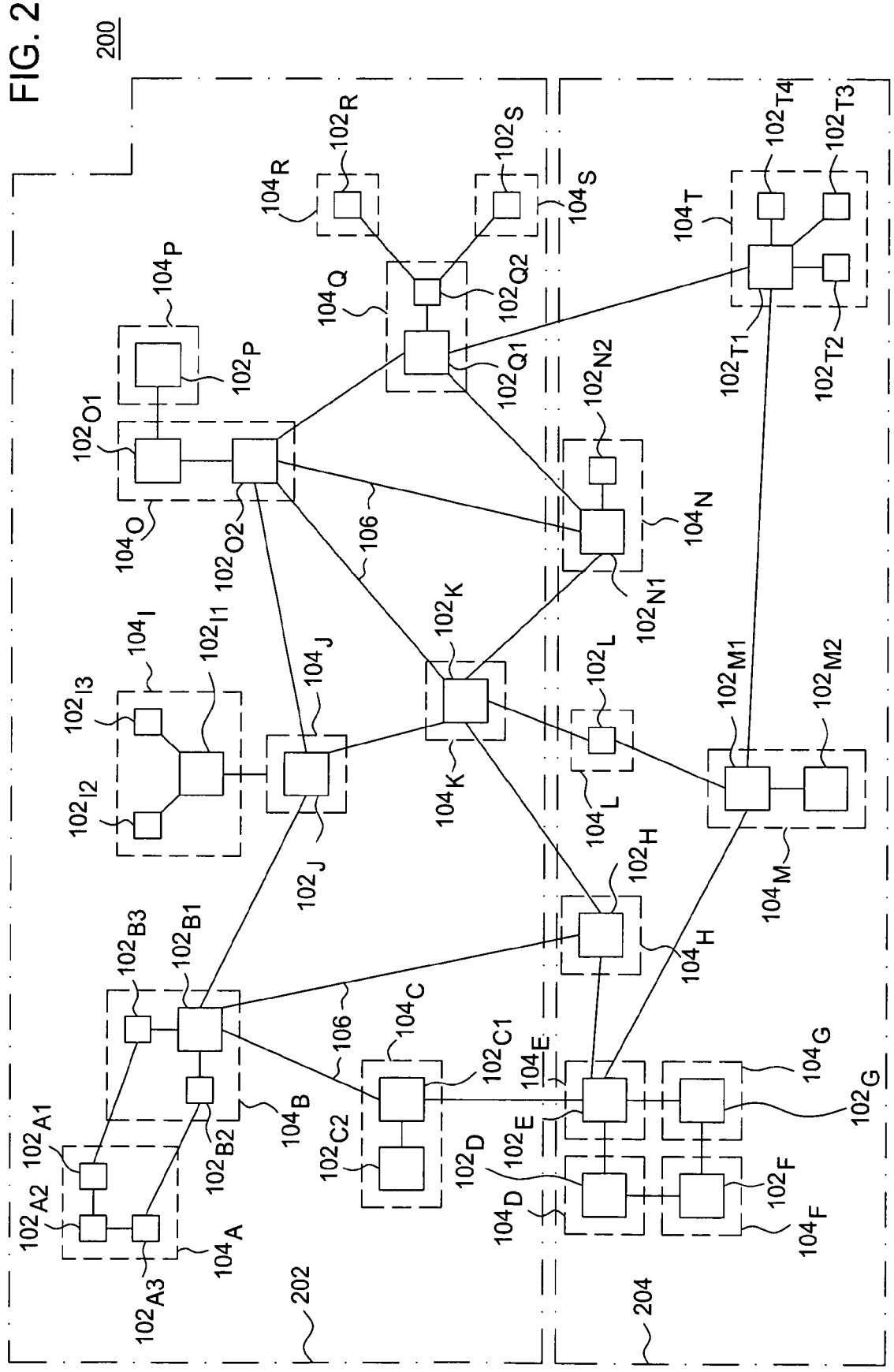
FIG. 2 depicts the communications network of FIG. 1 modeled according to a disaster.

FIG. 2 depicts the communications network of FIG. 1 modeled according to a disaster. Specifically, communications network 200 of FIG. 2 includes communications network 100 of FIG. 1 partitioned in accordance with a power outage disaster. As depicted in FIG. 2, communications network 200 is partitioned into a first region 202 and a second region 204. The first region 202 includes NELs $104_A$, $104_B$, $104_C$, $104_I$, $104_J$, $104_K$, $104_O$, $104_P$, $104_Q$, $104_R$, and $104_S$. The second region 204 includes NELs $104_D$, $104_E$, $104_F$, $104_G$, $104_H$, $104_L$, $104_M$, $104_N$, and $104_T$. For example, NELs 104 and NEs 102 associated with the first region 202 may be located in a first country served by a first power company, and the NELs 104 and NEs 102 associated with the second region 204 may be located in a second country served by a second power company. Although depicted as being partitioned according to a power outage disaster, those skilled in the art will appreciate that communications network 100 of FIG. 1 may be partitioned in various other configurations depending upon the disaster being modeled.

Figure 3:
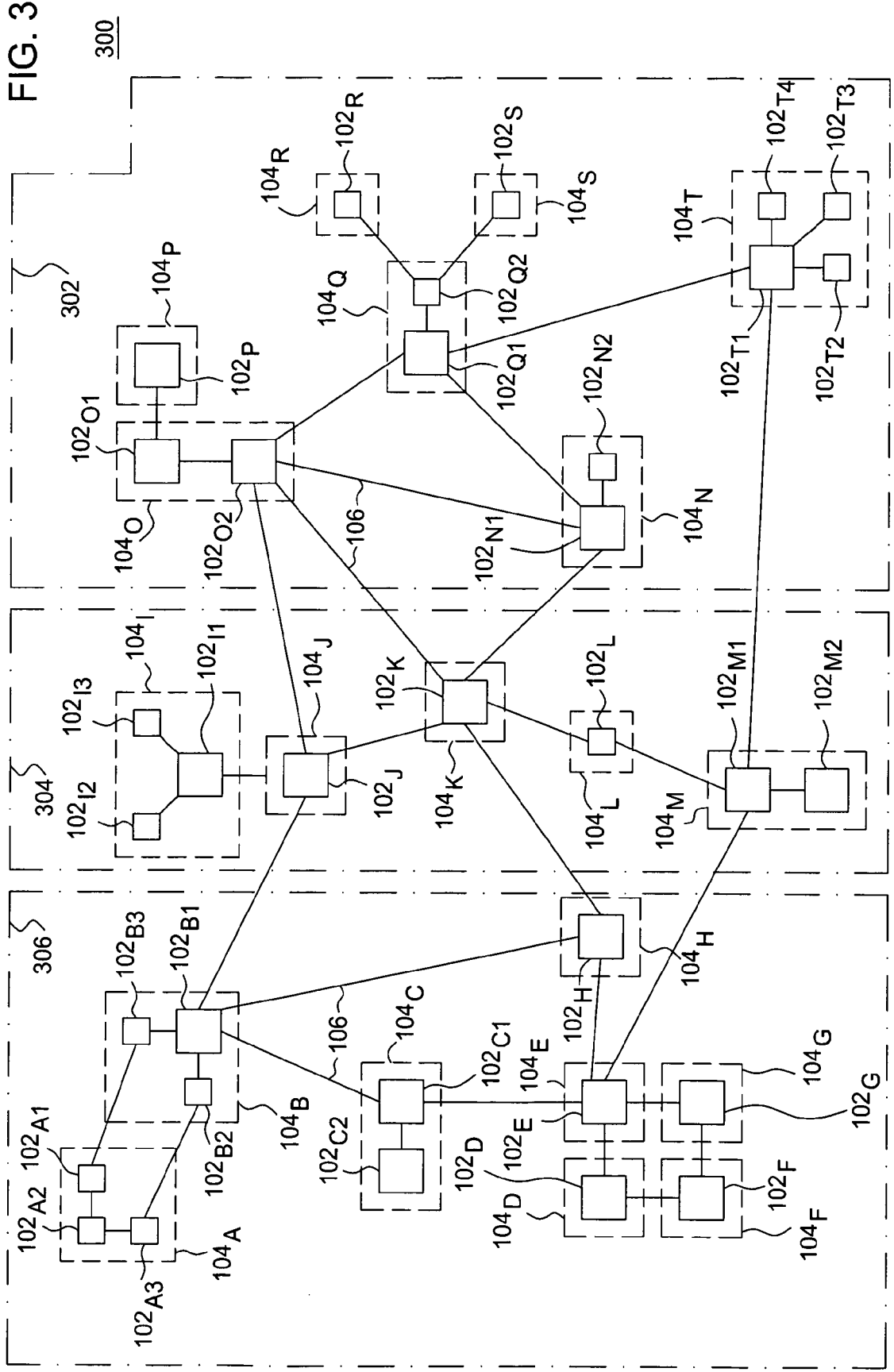
FIG. 3 depicts the communications network of FIG. 1 modeled according to a disaster.

FIG. 3 depicts the communications network of FIG. 1 modeled according to a disaster. Specifically, communications network 300 of FIG. 3 includes communications network 100 of FIG. 1 modeled in accordance with a hurricane disaster. As depicted in FIG. 3, communications network 300 is partitioned into a first region 302, a second region 304, and third region 306. Although not depicted, the partitioning depicted in FIG. 3 is based on proximity of the NELs 104 to an oceanic coastline (where first region 302 is nearest to the coastline and third region 306 is furthest from the coastline). The first region 302 includes NELs $104_N$, $104_O$, $104_P$, $104_Q$, $104_R$, and $104_S$, and $104_T$. The second region 304 includes NELs $104_I$, $104_J$, $104_K$, $104_L$, and $104_M$. The third region 306 includes NELs $104_A$, $104_B$, $104_C$, $104_D$, $104_E$, $104_F$, $104_G$, and $104_H$. Although depicted as being partitioned according to a hurricane disaster, those skilled in the art will appreciate that communications network 100 of FIG. 1 may be partitioned in various other configurations depending upon the disaster being modeled.

Figure 4:
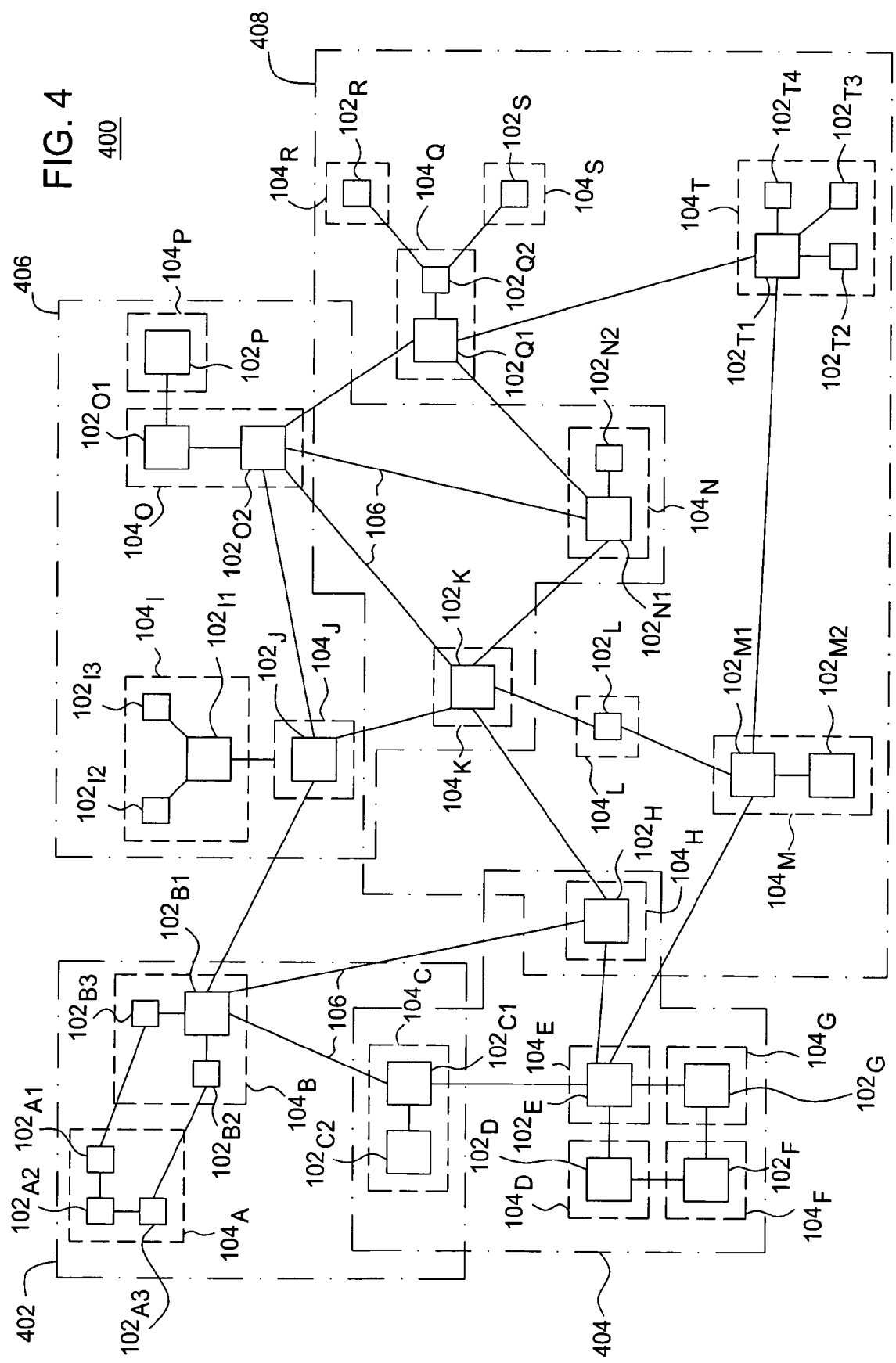
FIG. 4 depicts the communications network of FIG. 1 modeled according to a disaster.

FIG. 4 depicts the communications network of FIG. 1 modeled according to a disaster. Specifically, communications network 400 of FIG. 4 includes communications network 100 of FIG. 1 modeled in accordance with a disaster requiring a logical partitioning of the network such that at least a portion of the network elements belong to a plurality of geographical regions. As depicted in FIG. 4, communications network 400 is partitioned into a first region 402, a second region 404, a third region 406, and a fourth region 408. The first region 402 includes NELs $104_A$, $104_B$, and $104_C$. The second region 404 includes NELs $104_C$, $104_D$, $104_E$, $104_F$, $104_G$, and $104_H$. The third region 406 includes NELs $104_I$, $104_J$, $104_K$, $104_N$, $104_O$, and $104_P$. The fourth region 408 includes NELs $104_H$, $104_K$, $104_L$, $104_M$, $104_N$, $104_Q$, $104_R$, $104_S$, and $104_T$. Although depicted as being modeled according to a disaster requiring logical partitioning, those skilled in the art will appreciate that communications network 100 of FIG. 1 may be partitioned in various other configurations depending upon the disaster being modeled.

As depicted and described herein with respect to FIG. 1, FIG. 2, FIG. 3, and FIG. 4 in one embodiment, the present invention partitions the communications network under analysis into one or more geographical regions. In one embodiment, a geographical region comprises at least one of a geographical area, a plurality of geographical areas, a physical grouping of network elements, a logical grouping of network elements, and the like, as well as various combinations thereof. The geographical regions include network elements located in network element locations within the geographical regions. In one embodiment, at least one of the geographical region granularity and the network element location granularity depends on at least one of disaster type, desired accuracy of disaster impact assessments, and the like, as well as various combinations thereof.

As such, a geographical region may comprise a specific location on a floor in a building, the floor of a building, a building, a city block, a city, a county, a group of counties, a state, a group of states, a country, a group of countries, and the like, as well as various combinations thereof. For example, for a building fire disaster event, the network location granularity may be by individual building since building fires strike individual buildings (as opposed to striking an entire state). Similarly, for example, for a hurricane disaster event the network location granularity may be by region of a country (e.g., southeastern United States). Similarly, for example, for a power outage disaster event the network location granularity may be by state if one power company (or a specific power grid) serves one state and another power company serves another state. An equipment location may comprise a specific location on a floor in a building, a specific floor of a building, a building, and the like, as well as various combinations thereof.

It should be noted that depending upon the network type, network configuration, disaster type, and like factors, it is possible that a specific location lies along the span of a particular network element. For instance, if one of the network elements is a fiber ring, and the disaster is a fiber cut, it is possible that the specific location is the actual path of the fiber ring (irrespective of the physical path of the ring). In some instances, this may include paths lacking an associated physical entity. For example, in a ring topology, it is possible to have one section of the ring supported by microwave signals between two dish receivers. In this example, the specific location of the ring includes the space that lies between the two receivers and the model may include the freedom of the space between the two receivers from any obstruction that may cause a loss of communication between the receivers.

In accordance with the present invention, the expected impact to the communications network from a disaster is determined using a disaster analysis model. In one embodiment, the disaster analysis model of the present invention is determined by partitioning the communications network into one or more geographical regions (numbered $L_1$ to $L_F$, where F is the total number of geographical regions into which the network is partitioned), where each of the geographical regions includes at least one network element (numbered $E_1$ to $E_N$, where N is the total number of network elements in the network). In one embodiment, the disaster analysis model is defined for each of a plurality of disaster events (numbered $D_1$ to $D_E$, where E is the total number of disaster events under consideration). In one embodiment, the present invention models each of a plurality of disasters by network element location and the network elements associated with the network element locations.

In one embodiment, the disaster parameters of the disaster analysis model are provided on a per-disaster-type basis. In one such embodiment, the disaster analysis model comprises disaster parameters. In one embodiment, the disaster parameters comprise disaster probability parameters. In one embodiment, the disaster parameters comprise disaster impact parameters. In one embodiment, the disaster analysis model is represented as a disaster analysis model matrix. The disaster parameters of the disaster analysis model are customized to the geographical regions defined for each disaster type, the network element locations associated with the geographical regions, and the network elements associated with the network element locations.

In accordance with the present invention, the more general aspects of the disaster parameters are shared by network elements associated with a particular geographical region or a particular network element location, and the more specific aspects of the disaster parameters are individually defined for each of the network elements. In other words, although various parameters may be associated with geographical regions, network element locations, and the like, since each network element has a different precise location and, potentially, different network element characteristics, the disaster analysis model is defined on a network element by network element basis. As such, the disaster analysis model may be represented as a three-dimensional disaster analysis model matrix as follows (where Parameter$_{DIS}$ comprises any disaster analysis model parameter such as a disaster probability parameter, a disaster impact parameter, and the like):

$$\begin{bmatrix} Parameter(Pd) & E1 & \ldots & EN \\ D1 & Parameter_{DIS}[E1, D1] & \ldots & Parameter_{DIS}[EN, D1] \\ \ldots & \ldots & \ldots & \ldots \\ DE & Parameter_{DIS}[E1, DE] & \ldots & Parameter_{DIS}[EN, DE] \end{bmatrix}$$ (Matrix 1)

As depicted in Matrix 1, the disaster analysis model matrix comprises a disaster parameter (denoted as Parameter$_{DIS}$) associated with each network element $E_1$ through $E_N$ for each disaster $D_1$ through $D_E$. As described herein, in one embodiment, the disaster parameter of the disaster analysis matrix may comprise at least one of a disaster probability parameter and a disaster impact parameter. For example, as depicted in Matrix 2, in one embodiment, the disaster analysis model matrix comprises a disaster occurrence probability (denoted as Pd) associated with each network element $E_1$ through $E_N$ for each disaster $D_1$ through $D_E$:

$$\begin{bmatrix} Parameter(Pd) & E1 & \ldots & EN \\ D1 & Pd[E1, D1] & \ldots & Pd[EN, D1] \\ \ldots & \ldots & \ldots & \ldots \\ DE & Pd[E1, DE] & \ldots & Pd[EN, DE] \end{bmatrix}$$ (Matrix 2)

Furthermore, although primarily depicted as comprising one disaster parameter, in one embodiment, the disaster analysis model may be adapted such that the disaster analysis model may include at least one other disaster parameter associated with each network element for each disaster. In one embodiment, the disaster analysis model matrix is adapted such that additional layers of the disaster analysis model matrix may be defined for each of the input parameters defined below.

In one such embodiment, the additional disaster parameters that may be included in the disaster analysis model include the disaster occurrence rate, the disaster network element location impact probability, the disaster occurrence probability, the pre-mitigation network element disaster probability, the post-mitigation network element disaster probability, the permanent network element damage probability, the network element replacement cost, the network element service interruption indicator, the pre-mitigation data integrity loss probability, the post-mitigation data integrity loss probability, the network element relative worth indicator, the network element one-plus-one protection indicator, the network element mean-time-to-repair, the network element physical site parameter, the network element logical site parameter, the service interruption cost, and the like, as well as various combinations thereof.

In one embodiment, the disaster analysis model includes a disaster occurrence rate parameter (denoted as Rd). The disaster occurrence rate comprises the rate of occurrence of a disaster in a given location. In one embodiment, the given location corresponds to at least one of a political region, a geographical region, and the like, as well as various combinations thereof. For example, the region may comprise a city, a county, a group of counties, a state, a group of states, a country, a group of countries, a mountainous region (e.g., for a blizzard disaster), a low-lying region (e.g., for a flood disaster), and the like, as well as various combinations thereof. In another embodiment, the given location corresponds to one of the geographical region in which the network element is located, the equipment location in which the network element is located, and the like. In one embodiment, the disaster occurrence rate is expressed as a frequency (i.e., the ratio of X occurrences of the disaster in Y years for the given disaster).

In general, the region for which the disaster occurrence rate is determined is dictated by the statistics available for that disaster. For example, if the disaster is a lightening strike, but individual city blocks do not keep statistics on lightening strikes within a city block, the region may comprise the city if the city maintains statistics on lightening strikes across the city as a whole. For example, if the disaster is a tornado, but individual counties of a particular state do not keep statistics on tornados per county, the region may comprise the state if the state maintains statistics on tornados across the entire state as a whole. In one embodiment, various different sources of disaster occurrence rate data may need to be used. For example, if the state does not maintain statistics on tornados that occur within the state, such statistics may be obtained from the National Weather Service (NWS), the Federal Emergency Management Agency (FEMA), private insurance companies, and various other sources (depending on the disaster type), as well as various combinations thereof.

Furthermore, even if such data is available at a lower level, in one embodiment, depending on the disaster type, a broader location may be selected for use in determining the disaster occurrence rate. For example, although it may be possible to determine the rate of occurrence of floods in a particular city, the scope of the given location may be widened to determine the rate of occurrence of floods at the county level. Of course, the rate of occurrence of floods at the county level is larger than the rate of occurrence of floods at the city level. As such, this difference in disaster occurrence rate is balanced by the disaster network element location impact probability parameter.

In one embodiment, the disaster analysis model includes a disaster network element location impact probability parameter (denoted as Ph). The disaster network element location impact probability comprises the probability of a direct hit by the disaster on the equipment location. In one embodiment, the equipment location comprises a location within the geographical region. In one embodiment, the equipment location comprises at least one of a state, a portion of a state, a county, a portion of a county, a city, a portion of a city, a building, a portion of a building (e.g., a particular floor in the building), and the like, as well as various combinations thereof. In one such embodiment, the equipment location comprises a location within the given location for which the disaster occurrence rate Rd is determined. As such, in one embodiment, the area of the equipment location is less than or equal to the area of the given location for which the disaster occurrence rate Rd is determined.

In one embodiment, the disaster network element location impact probability is determined using the disaster occurrence rate. For example, assuming a disaster strike at the disaster occurrence rate Rd scope, the disaster network element location impact probability Ph comprises the probability that the disaster strike will directly affect the equipment location in which the network element is located. For example, considering Rd as the rate of occurrence of a flood in a city, then Ph is greater than if Rd is considered to be the rate of occurrence of a flood in the county in which that city is located. In a first approach, a determination is made that floods occur in a city at the disaster occurrence rate of one every five years and, of those occurrences, the flood impacts a particular building in the city at a rate of one out of seven floods. In a second approach, a determination is made that floods occur in a county at the disaster occurrence rate twice per year and, of those occurrences, the flood impacts a particular building in the city at a rate of one out of seventy county-wide floods. As such, irrespective of the approach, the resulting disaster network element location impact probability indicates that floods occur at that particular building in the city at an average rate of once every thirty-five years.

In one embodiment, the disaster analysis model includes a disaster occurrence probability parameter (denoted as Pd). The disaster occurrence probability comprises the probability of occurrence of a given disaster (Dj) a given number of times (a) during a time period (T) at a given network element (Ei) location. In one embodiment, the disaster occurrence probability is computed using the disaster occurrence rate Rd and the disaster network element location impact probability Ph. In one embodiment, the disaster occurrence probability is modeled using a Gaussian distribution. In one such embodiment, the disaster occurrence probability is computed using the disaster occurrence rate Rd and the disaster network element location impact probability Ph as shown in Eq. 1:

$$Pd_{(Ei,Dj)}(a, T) = e^{-(Rd_{(Ei,Dj)} * Ph_{Ei,Dj)} * T)} \left[ \frac{(Rd_{(Ei,Dj)} * Ph_{(Ei,Dj)} * T)^a}{a!} \right] \quad \text{(Eq. 1)}$$

In one embodiment, the disaster occurrence probability Pd is determined as a probability of occurrence of a given disaster (Dj) at least once (a=1+) during a time period (T) at a given network element (Ei) location. This formulation of Pd is depicted as shown in Eq. 2. In one such embodiment, rather than computing the summation of disaster occurrence probabilities over every number of occurrence (i.e., for each value of a≧1), the probability of occurrence of a disaster at least once during a time period may be expressed using a simplified expression by merely determining the probability of occurrence of a given disaster zero times (a=0) during a time period at a given network element location. This simplified formulation of Pd is depicted as shown in Eq. 3.

$$Pd_{(Ei,Dj)}(1 +, T) = \sum_{k=1}^{\infty} Pd_{(Ei,Dj)}(k, T) \quad \text{(Eq. 2)}$$

$$Pd_{(Ei,Dj)}(1 +, T) = 1 - Pd_{(Ei,Dj)}(0, T) = 1 - e^{-(Rd_{(Ei,Dj)} * Ph_{(Ei,Dj)} * T)} \quad \text{(Eq. 3)}$$

Although primarily described herein with respect to an embodiment in which network elements comprise physical network equipment (e.g., switches, routers, cross-connects, and the like), in one embodiment, a network element may comprise other physical network components such as optical fibers, coaxial cables, and the like. Since such network elements may traverse large geographical areas (e.g., across states, countries, internationally, and the like), the given location over which the disaster occurrence rate is determined may comprise a large area (e.g., a swath across a plurality of states, a country, a plurality of countries, and the like). In one such embodiment, the equipment location over which the disaster network element location impact probability is determined may comprise the path that the physical fiber follows between network elements.

For example, considering a fiber cut disaster event, the fiber span may be treated as a geographical region (or a given location over which the disaster occurrence rate is determined). In this example, all of the available data regarding the fiber cut is built into the disaster occurrence rate Rd parameter. In continuation of this example, assuming that the fiber ring under consideration has suffered five fiber cuts over the last five years (where the time interval T is equal to five years), the disaster occurrence probability Rd would be set to one (that is, five occurrences in five years, i.e., one per year) and the disaster network element location impact probability Ph would be set equal to one (since the given location is the same as the equipment location, so a disaster at given location is the same as a disaster at the equipment location). In another example, considering a fiber cut on a section of a fiber ring, generation of the disaster analysis model would require additional statistics on the section of the ring under consideration (independent of the rest of the ring).

Furthermore, in one embodiment, a network element may comprise logical network components such as network services, third-party services, and the like. In one such embodiment, the logical network components may be modeled as one or more network elements. For example, if a network service being evaluated using the disaster analysis model depends upon a third-party service, the third-party service may be modeled as a separate network element included within the disaster analysis model. In continuation of this example, the disaster occurrence rate Rd may correspond to the number of interruptions of the third-party service per year and the disaster network element location impact probability may be set equal to one (Ph=1) since if the service is interrupted, the disaster network element location impact probability would logically be one hundred percent. Although described herein with respect to network services and third-party services, various other logical network components may be modeled as network elements for inclusion in the disaster analysis model in accordance with the present invention.

In one embodiment, the disaster analysis model includes a pre-mitigation network element damage probability parameter (denoted as Pk). The pre-mitigation network element damage probability comprises the probability of damage to a network element before any mitigation actions (i.e., the probability of damage to an existing equipment location as the existing equipment location now stands). For example, pre-mitigation network element damage probability is the probability that if a flood does occur at the equipment location under consideration that the flood water bypasses any defenses that the equipment location may include for preventing flooding damage and that the flood water damages the network element under consideration. For example, in the case of a flood disaster event, the pre-mitigation network element damage probability may be much lower for a network element on the second floor of the equipment location than a network element on the first floor of the equipment location since the flood waters would have to reach much higher to damage the network element on the second floor than to damage the network element on the first floor.

In one embodiment, the disaster analysis model includes a post-mitigation network element damage probability parameter (denoted as Pm). The post-mitigation network element damage probability comprises the probability of damage to a network element after any mitigation actions (i.e., the probability of damage to an existing equipment location after the existing equipment location is modified to reduce the probability of damage to network elements located therein). For example, post-mitigation network element damage probability is the probability that if a flood does occur at the equipment location under consideration that the flood water bypasses any defenses (including the newly added disaster mitigating defenses) that the equipment location may include for preventing flooding and that the flood water damages the network element under consideration. In general, the post-mitigation network element damage probability should be less than the pre-mitigation network element damage probability.

As such, a cost-benefit analysis may be performed to determine the degree to which the disaster occurrence probability may be improved by spending a certain amount of capital on mitigating actions to lower the probability of damage from a particular disaster. In other words, a comparison may be performed between the pre-mitigation network element damage probability and the post-mitigation network element damage probability after considering the implementation of certain mitigating recommendations (e.g., where the mitigating recommendations are proposed in a BCDP plan), to limit or eliminate the damage caused by a given disaster. For example, in the case of a flood, an equipment location which has high capacity water pumps is much less likely to suffer damage that may result from the flood as opposed to a facility with no such equipment. Since different sets of mitigation recommendations may be made, resulting in different Pm's and different associated BCDP readiness levels, the disaster analysis model may be run several times to evaluate BCDP scores under all the sets of mitigation recommendations.

In one embodiment, the disaster analysis model includes a permanent equipment damage parameter (denoted as Pg). In one embodiment, the permanent equipment damage parameter comprises a permanent equipment damage probability (i.e., the probability of permanent equipment damage resulting from the given disaster). In general, the permanent equipment damage probability Pg is set equal to zero (e.g., for a power outage, a soft disgruntled employee cyber attack which brings down the network but does not result in equipment damage, and like disasters that are highly unlikely to result in equipment damage) or one (e.g., for tornados, terrorist attacks, tsunamis, and like disasters that are highly likely to result in permanent and comprehensive equipment damage).

In one embodiment, the permanent equipment damage parameter Pg may be set to a value such that $0<Pg<1$. In this embodiment, Pg may represent at least one of a probability (or percentage combination) that the network element will suffer at least some minimal amount of permanent damage, a percentage of the network element that suffers permanent damage (e.g., by network element capacity), a percentage of the total equipment value that is lost due to permanent damage to the network element, and like partial measures, as well as various combinations thereof.

In one embodiment, the permanent equipment damage parameter includes a combination of the probability of the damage and the amount of damage that is likely to result in a particular disaster strike scenario. For example, in a flood, the low bays of a network element may be modeled as being water damaged while the high bays of the network element may be modeled as being safe. In continuation of this example, assuming that one out of three bays is damaged, and cost associated with each of the three bays is the same, Pg may be set to 0.33 to denote that only one third of the equipment is damaged and that two thirds of the equipment is not damaged.

In one embodiment, the disaster analysis model includes a network element replacement cost parameter (denoted as Ce). The network element replacement cost comprises the total cost to replace a particular network element if the network element is damaged as a result of a disaster to the point where the network element must be substantially repaired or replaced. In one embodiment, in addition to the price of the network element, the network element replacement cost includes network element shipment costs, network element installation costs, and like network element replacement related expenses.

In one embodiment, the disaster analysis model includes a network element service interruption indicator parameter (denoted as Si). The network element service interruption indicator provides an indication as to whether an outage of the network element under consideration is likely to result in service interruption. In general, the various network elements in a given network play different and unequal roles. While some network elements are essential to normal service operation (e.g., there can be no service when these network elements fail), other network elements are not essential to normal service operation (e.g., there can be full or partially reduced service when these network elements fail). For example, backbone switches, routers, and the like may be categorized as essential network elements while network elements handling billing, network inventory, and the like may be categorized as non-essential network elements.

In general, the network element service interruption indicator Si is set equal to zero (i.e., for network elements not essential to providing service) or one (i.e., for network elements essential to providing service). In one embodiment, the network element service interruption indicator Si may be set to a value such that $0<Si<1$. In this embodiment, Si may represent at least one of a probability that damage to the network element results in at least some level of service interruption, a percentage of service interruption that will result from damage to the network element, a percentage of total revenue lost as a result of damage to the network element that results in service interruption, and like partial measures, as well as various combinations thereof.

In one embodiment, the disaster analysis model includes a service interruption cost parameter (denoted as Sl). The service interruption cost comprises the total cost due to service interruption if network element Ei fails due to some disaster Dj. In one embodiment, the service interruption cost comprises lost revenue due to the service interruption. In one further embodiment, in which the network operator is required to meet a service level agreement (SLA) to provide a particular quality of service, the service interruption cost may comprise penalties assessed due to the service interruption as a result of the failure of the network operator to meet the requirements of the SLA. In one embodiment, service interruption cost Sl is independent of the disaster event since as long as the disaster causes service interruption that results in service interruption losses, the disaster that caused the service interruption is most likely irrelevant. In another embodiment, service interruption cost Sl is dependent on the disaster event.

In one embodiment, the disaster analysis model includes a network element mean-time-to-repair parameter (denoted as MTTR). The network element mean-time-to-repair comprises the amount of time required to repair or replace a damaged network element. It should be noted that this includes the time that must elapse for the disaster event to pass such that the network element may be available to initiate repairs. In one embodiment, the MTTR depends upon the disaster being modeled. As defined in the disaster analysis model, the network element mean-time-to-repair comprises the amount of time required to repair or replace a network element damaged by a disaster event. In one embodiment, the network element mean-time-to-repair is measured in hours required to repair or replace the damaged network element. Although described herein as being measured in hours, those skilled in the art will appreciate that the MTTR may be measured in various other increments of time. In one embodiment, MTTR comprises the amount of time that service is interrupted due to the damage to the network element.

In one embodiment, the disaster analysis model includes a disaster physical location parameter (denoted as Ploc). In one embodiment, the disaster physical location comprises the geographical region. In another embodiment, the disaster physical location comprises the equipment location. In general, the disaster physical location operates to define a scope of impact for a given disaster, and the disaster physical location may be defined differently for different disasters. For example, for a fire disaster, the disaster physical location may be the entire building in which the network element is located. For example, for a more far-reaching disaster (e.g., a power outage), the disaster physical location may be a city block, an entire city, a county, and the like. As such, disaster physical location may define a cluster of network elements such that if a disaster strikes any of the network elements in that cluster, all other network elements in the cluster would be equally exposed to the same disaster strike.

In one embodiment, the disaster analysis model includes a disaster logical location parameter (denoted as Lloc). In general, the disaster logical location operates to define a scope of impact for a given disaster, and the disaster logical location may be defined differently for different disasters. In one embodiment, a disaster logical location is defined such that, if any service-essential network element in a logical location is damaged by a disaster strike, then a service interruption occurs over the entire scope of the disaster logical location, while network elements in other logical locations continue providing service over respective service coverage areas associated with those logical locations.

In one embodiment, the disaster analysis model includes a pre-mitigation data integrity loss probability parameter (denoted as Dio). The pre-mitigation data integrity loss probability comprises the probability of loss of data integrity that would result from damage to a network element before any mitigation actions (i.e., the probability of loss of data integrity as the existing equipment location where the network element is located now stands). For example, pre-mitigation data integrity loss probability is the probability that if a flood does impact a network element that the flood water bypasses any defenses that the equipment location may include for preventing flooding and that the flood water damages the network element under consideration, thereby resulting in loss of data integrity. For example, in the case of a flood disaster event, the pre-mitigation data integrity loss probability may be much lower for a network element on the second floor of the equipment location than a network element on the first floor of the equipment location since the flood waters would have to reach much higher to impact the data integrity of the network element on the second floor than to impact the data integrity of the network element on the first floor.

In one embodiment, the disaster analysis model includes a post-mitigation data integrity loss probability parameter (denoted as Dim). The post-mitigation data integrity loss probability comprises the probability of loss of data integrity that would result from damage to a network element after any mitigation actions (i.e., the probability of the loss of data integrity due to damage to a network element after the existing equipment location is modified to reduce the probability of damage to network elements located therein). For example, post-mitigation data integrity loss probability is the probability that if a flood does occur at the equipment location under consideration that the flood water bypasses any defenses (including the newly added disaster mitigating defenses) that the equipment location may include for preventing flooding and that the flood water damages the network element under consideration, thereby resulting in a loss of data integrity. In general, the post-mitigation data integrity loss probability should be less than the pre-mitigation data integrity loss probability.

In one embodiment, the disaster analysis model includes a network element relative worth indicator parameter (denoted as Rw). In general, the various network elements in a given network play different and unequal roles. In such cases, the accuracy of the expected impact processing may be improved by explicitly giving certain network elements more importance by making their failure carry additional weight. As such, the network element relative worth indicator provides a means for defining the relative worth of the network elements in the network. For example, it may be useful to exclude certain network elements from a particular disaster model (e.g., the same network element exposure to that disaster is covered under a different disaster model). In this example, the network element may be excluded from the disaster model by assigning a relative worth of zero. For example, optical fiber rings may suffer cuts as a result of various different disasters. As such, in one embodiment, a flood disaster model may exclude fiber rings from the analysis since fiber ring cuts may be modeled in another disaster model (e.g., Fiber Cut Disasters) that includes fiber cut disasters that result from all natural disasters, including flooding.

In one embodiment, the network element relative worth indicator is set to the same value (e.g., Rw=1) for all network elements in the network. In another embodiment, the network element relative worth indicator Rw is set within the range $0 \leq Rw \leq 0.5$ for network elements not essential to providing service and is set within the range $0.5 \leq Rw \leq 1$ for each of the network elements that are included in the model and scope of any given disaster. In this embodiment, Rw may represent at least one of a higher priority for certain network elements over other network elements in the same disaster analysis, a penalty that may be associated with certain network element failures in a disaster strike (but not with other network elements), a percentage of total revenue lost (including SLA penalties) a result of damage to the network element that results in service interruption, and like partial measures, as well as various combinations thereof.

In one embodiment, the disaster analysis model includes a network element one-plus-one protection indicator parameter (denoted as oPo). In many instances, the best protection against service failure in a network may be to have at least a partial second network (i.e., a standby network) ready to support service in response to a failure of at least a portion of the original network. Unfortunately, however, one-plus-one protection is not always effective, practical, or cost effective for some kinds of network elements. As such, in one embodiment, the network element one-plus-one protection indicator represents the effectiveness of one-plus-one protection on a given network element.

In one such embodiment, network element one-plus-one protection indicator is defined so that a value of oPo approaching one indicates that one-plus-one protection is highly effective for the network element and a value of oPo approaching zero indicates that one-plus-one protection is not at all effective for the network element. In another embodiment, the network element one-plus-one protection indicator represents an indication as to whether the network element is operable for being protected using one-plus-one protection. In this embodiment, the network element one-plus-one protection indicator oPo is set equal to either zero (i.e., the network element cannot be protected using one-plus-one protection) or one (i.e., the network element can be protected using one-plus-one protection).

As such, as described herein, a disaster analysis model may comprise various combinations of disaster probability parameters and disaster analysis parameters associated with various combinations of network elements. Although primarily described herein with respect to network elements such as switches, routers, and the like, in one embodiment, network links, network databases, and other network elements are included in the disaster analysis model. Furthermore, in one embodiment, logical components of the communications network may be modeled and analyzed with respect to the associated expected impact of various disasters. A method for generating a disaster analysis model is depicted and described herein with respect to FIG. 5.

Figure 5B:
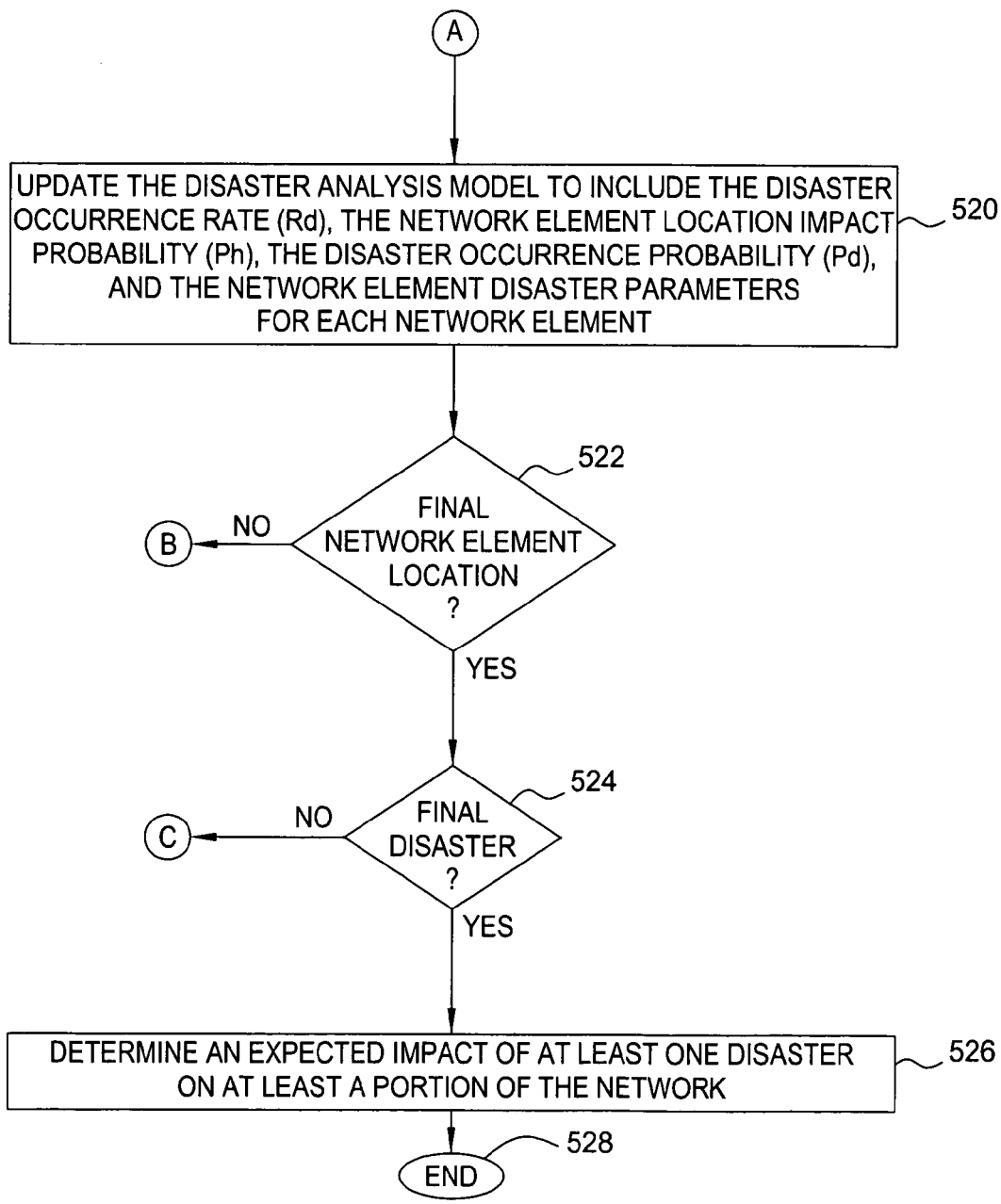
FIG. 5 depicts a flow diagram of a method according to one embodiment of the invention.

FIG. 5 depicts a flow diagram of a method according to one embodiment of the invention. Specifically, method 500 of FIG. 5 comprises a method for generating a disaster analysis model. Although a portion of the steps are depicted as being performed serially, those skilled in the art will appreciate that at least a portion of the steps of method 500 may be performed contemporaneously, as well as in a different order than presented in FIG. 5. Furthermore, although described herein with respect to particular disaster analysis parameters, the methodologies depicted and described herein with respect to FIG. 5 may be utilized for determining various other disaster parameters. The method 500 is entered as step 502 and proceeds to step 504.

At step 504, a disaster is identified. In one embodiment, the identified disaster is the disaster for which disaster analysis modeling is to be performed. At step 506, the network is partitioned into one or more geographical regions. At step 508, network element locations associated with each of the geographical regions are determined. At step 510, network elements associated with each of the network element locations are determined. At step 512, a disaster occurrence rate (denoted as Rd) is determined. At step 514, a network element location impact probability (denoted as Ph) is determined. At step 516, a disaster occurrence probability (denoted as Pd) is determined. In one embodiment, the disaster occurrence probability is determined for at least one of the geographical region, the network element location, and the like. In one embodiment, the disaster occurrence probability (Pd) is determined using the disaster occurrence rate (Rd) and the network element location impact probability (Ph).

At step 518, at least one additional network element disaster parameter is determined for each network element. In one embodiment, the network element disaster parameters include a pre-mitigation network element damage probability (Pk), a post-mitigation network element damage probability (Pm), a permanent equipment damage parameter (Pg), a network element replacement cost (Ce), a network element service interruption indicator (Si), a service interruption cost (Sl), a network element mean-time-to-repair (MTTR), a disaster physical location parameter (Ploc), a disaster logical location parameter (Lloc), a pre-mitigation data integrity loss probability (Dio), a post-mitigation data integrity loss probability (Dim), a network element relative worth indicator (Rw), a network element one-plus-one protection indicator (oPo), and like network element disaster parameters.

At step 520, the disaster analysis model is updated to include the disaster occurrence rate (Rd), the network element location impact probability (Ph), the disaster occurrence probability (Pd), and the additional network element disaster parameters. At step 522, a determination is made as to whether the final network element location has been processed. If the final network element location has not been processed, method 500 returns to step 510, at which point the network elements associated with the next network element location are determined. If the final network element location has been processed, method 500 proceeds to step 524.

At step 524, a determination is made as to whether the final disaster has been processed. If the final disaster has not been processed, method 500 returns to step 504, at which point the next disaster is identified for inclusion in the disaster analysis model. If the final disaster has been processed, method 500 proceeds to step 526. At step 526, the expected impact of at least one disaster on at least a portion of the network is determined, and the method 500 then proceeds to step 528, where the method 500 ends. In one embodiment, the determination of the expected impact is performed using at least a portion of the disaster analysis model. A method for determining an expected impact of at least one disaster on at least a portion of a communications network is depicted and described herein with respect to FIG. 6.

In general, the present invention utilizes the disaster analysis model for evaluating disaster risks and disaster impacts on a network element by network element and a disaster by disaster basis. In one embodiment, upon completion of such analysis, the disaster analysis results are combined to achieve an overall expected network impact. In one embodiment, the disaster analysis model uses a time interval (denoted as T) as in input parameter for performing disaster preparedness analysis in accordance with the present invention. In one such embodiment, the time interval parameter T may be changed based on the available disaster statistics, business considerations, and the like, as well as various combinations thereof. In one embodiment, the present invention analyzes the impact of one-plus-one protection on disaster probability and disaster impact.

In one embodiment, the expected network impact is represented as exposure risk. In one such embodiment, the savings achieved through mitigation may be computed as the difference between a pre-mitigation exposure risk and post-mitigation exposure risk. In one embodiment, exposure risk comprises the risk of exposure of a network element (Ei) to a disaster (Dj) over a period of years T. The pre-mitigation exposure risk is a probability of exposure of the network element to the disaster before a mitigation action. The post-mitigation exposure risk is a probability of exposure of the network element to the disaster after a mitigation action. As depicted herein, pre-mitigation exposure risk is computed as shown in Eq. 4A and post-mitigation exposure risk is computed as shown in Eq. 4B:

$$Xbm_{(Ei,Dj)} = Pd_{(Ei,Dj)}(1+T)*Pk_{(Ei,Dj)} \quad \text{(Eq. 4A)}$$

$$Xam_{(Ei,Dj)} = Pd_{(Ei,Dj)}(1+T)*Pm_{(Ei,Dj)} \quad \text{(Eq. 4B)}$$

In one embodiment, the expected network impact is represented as a network element equipment damage cost. In one such embodiment, the savings achieved through mitigation may be computed as the difference between a pre-mitigation network element equipment damage cost and post-mitigation network element equipment damage cost. In one further embodiment, in which mitigation includes use of one-plus-one protection, the post-mitigation network element equipment damage cost may be computed taking into account the one-plus-one protection. In one embodiment, network element equipment damage cost comprises the equipment damage cost caused to a network element (Ei) by a disaster event (Dj). As depicted herein, pre-mitigation network element equipment damage cost is computed as shown in Eq. 5A, post-mitigation network element equipment damage cost is computed as shown in Eq. 5B, and post-mitigation network element equipment damage cost (one-plus-one protection) is computed as shown in Eq. 5C:

$$Gbm_{(Ei,Dj)} = Pg_{(Ei,Dj)}*Pk_{(Ei,Dj)}*Ce_{(Ei,Dj)} \quad \text{(Eq. 5A)}$$

$$Gam_{(Ei,Dj)} = Pg_{(Ei,Dj)}*Pm_{(Ei,Dj)}*Ce_{(Ei,Dj)} \quad \text{(Eq. 5B)}$$

$$Gopo_{(Ei,Dj)} = Gam_{(Ei,Dj)} \quad \text{(Eq. 5C)}$$

In one embodiment, the expected network impact is represented as a network element service interruption cost. In one such embodiment, the savings achieved through mitigation may be computed as the difference between a pre-mitigation network element service interruption cost and post-mitigation network element service interruption cost. In one further embodiment, in which mitigation includes use of one-plus-one protection, the post-mitigation network element service interruption cost may be computed taking into account the one-plus-one protection. In one embodiment, network element service interruption cost resulting from service interruption caused by exposing a network element (Ei) to a disaster event (Dj) is computed using service cost functions defining network element service interruption cost. As depicted herein, pre-mitigation network element service interruption cost is computed as shown in Eq. 6A, post-mitigation network element service interruption cost is computed as shown in Eq. 6B, and post-mitigation network element service interruption cost (one-plus-one protection) is computed as shown in Eq. 6C:

$$SEbm_{(Ei,Dj)} = Sl_{(Ei,Dj)}*Pk_{(Ei,Dj)}*Si_{(Ei,Dj)}*MTTR_{(Ei,Dj)} \quad \text{(Eq. 6A)}$$

$$SEam_{(Ei,Dj)} = Sl_{(Ei,Dj)}*Pm_{(Ei,Dj)}*Si_{(Ei,Dj)}*MTTR_{(Ei,Dj)} \quad \text{(Eq. 6B)}$$

$$SEopo_{(Ei,Dj)} = SEam_{(Ei,Dj)}*(1-oPo_{(Ei,Dj)}) \quad \text{(Eq. 6C)}$$

In one embodiment, since a network element service failure affects the entire logical site of that network element (due to the connectivity between network elements), actual network element service interruption cost may be computed as a maximum of the network element service interruption costs over the entire scope of the logical site of the network element impacted by the disaster event. In one such embodiment, each logical site of a network element Ei is denoted as: $LSite_{(Ei)}$. As depicted herein, and for each logical site to which the network element belongs, pre-mitigation actual network element service interruption cost is computed as shown in Eq. 7A, post-mitigation actual network element service interruption cost is computed as shown in Eq. 7B, and post-mitigation actual network element service interruption cost (one-plus-one protection) is computed as shown in Eq. 7C:

$$Sbm_{(Ei,Dj)} = \underset{Ek\_in\_logical\_site\_Lsite_{(Ei)}}{\text{Max}} (SEbm_{(Ek,Dj)}) \quad \text{(Eq. 7A)}$$

$$Sam_{(Ei,Dj)} = \underset{Ek\_in\_logical\_site\_Lsite_{(Ei)}}{\text{Max}} (SEam_{(Ek,Dj)}) \quad \text{(Eq. 7B)}$$

$$Sopo_{(Ei,Dj)} = \underset{Ek\_in\_logical\_site\_Lsite_{(Ei)}}{\text{Max}} (SEopo_{(Ek,Dj)}) \quad \text{(Eq. 7C)}$$

In one embodiment, the expected network impact is represented as a total network element disaster cost. The total network element disaster cost comprises the total cost of a disaster Dj impacting a network element Ei. In one embodiment, the network element disaster cost comprises a network element equipment damage cost portion and a network element actual service interruption cost portion (e.g., revenue lost due to service interruption, penalties imposed for failure to meet a service level agreement (SLA) due to service interruption, and the like, as well as various combinations thereof). In one such embodiment, the network element disaster cost is computed as a summation of the network element equipment damage cost associated with that network element and the actual network element service interruption cost associated with that network element. As depicted herein, pre-mitigation total network element disaster cost is computed as shown in Eq. 8A, post-mitigation total network element disaster cost is computed as shown in Eq. 8B, and post-mitigation total network element disaster cost (one-plus-one protection) is computed as shown in Eq. 8C:

$$Cbm_{(Ei,Dj)} = Gbm_{(Ei,Dj)} + Sbm_{(Ei,Dj)} \quad \text{(Eq. 8A)}$$

$$Cam_{(Ei,Dj)} = Gam_{(Ei,Dj)} + Sam_{(Ei,Dj)} \quad \text{(Eq. 8B)}$$

$$Copo_{(Ei,Dj)} = Gopo_{(Ei,Dj)} + Sopo_{(Ei,Dj)} \quad \text{(Eq. 8C)}$$

In one embodiment, the expected network impact is represented as a total physical site disaster cost. The total physical site disaster cost comprises the total cost of a disaster Dj occurring at a physical site Lk. In one embodiment, the physical site disaster cost comprises a network element equipment damage cost portion and a network element actual service interruption cost portion. In one such embodiment, the physical site disaster cost is computed as a summation of the summation of the network element equipment damage costs associated with the network elements in that physical site and the maximum of the actual network element service interruption cost over the set of all network elements in that physical site. As depicted herein, pre-mitigation total network element location disaster cost is computed as shown in Eq. 9A, post-mitigation total network element location disaster cost is computed as shown in Eq. 9B, and post-mitigation network element location disaster cost (one-plus-one protection) is computed as shown in Eq. 9C:

$$LCbm_{(Ll)(Dj)} = \left( \sum_{Ei\_in\_phys\_loc\_Ll} Gbm_{(Ei,Dj)} \right) + \underset{Ek\_in\_phys\_site\_Ploc_{(Ei)}}{\text{Max}} (Sbm_{(Ek,Dj)}) \quad \text{(Eq. 9A)}$$

-continued $$LCam_{(Ll)(Dj)} = \left(\sum_{Ei\_in\_phys\_loc\_Ll} Gam_{(Ei,Dj)}\right) + \underset{Ek\_in\_phys\_site\_Ploc_{(Ei)}}{\text{Max}} (Sam_{(Ek,Dj)}) \quad \text{(Eq. 9B)}$$

$$LCopo_{(Ll)(Dj)} = \left(\sum_{Ei\_phys\_loc\_Ll} Gopo_{(Ei,Dj)}\right) + \underset{Ek\_phys\_loc\_Ploc_{(Ei)}}{\text{Max}} (Sopo_{(Ek,Dj)}) \quad \text{(Eq. 9C)}$$

In one embodiment, the expected network impact is represented as a total network disaster cost. The total network disaster cost comprises the total cost of a disaster Dj on the entire communications network. In one embodiment, the total network disaster cost comprises a network element equipment damage cost portion and a network element actual service interruption cost portion. In one such embodiment, the total network disaster cost is computed as a summation of the summation of the network element equipment damage costs associated with all network elements in the network and the maximum of the actual network element service interruption cost over the set of all network elements in a particular portion of the network (e.g., the entire network, per physical site, and the like).

In another embodiment, the total network disaster cost is computed as a summation of the total physical site disaster costs for each of the network element locations associated with the communications network. As depicted herein, pre-mitigation total network disaster cost is computed as shown in Eq. 10A, post-mitigation total network disaster cost is computed as shown in Eq. 10B, and post-mitigation total network disaster cost (one-plus-one protection) is computed as shown in Eq. 10C:

$$NCbm_{(Ll)(Dj)} = \left(\sum_{phys\_loc\_Ll\_in\_network\_N} LCbm_{(Ll,Dj)}\right) \quad \text{(Eq. 10A)}$$

$$NCam_{(Ll)(Dj)} = \left(\sum_{phys\_loc\_Ll\_in\_network\_N} LCam_{(Ll,Dj)}\right) \quad \text{(Eq. 10B)}$$

$$NCopo_{(Ll)(Dj)} = \left(\sum_{phys\_loc\_Ll\_in\_network\_N} LCopo_{(Ll,Dj)}\right) \quad \text{(Eq. 10C)}$$

In one embodiment, the expected network impact is represented as data integrity risk. In one such embodiment, the savings achieved through mitigation may be computed as the difference between a pre-mitigation data integrity risk and post-mitigation data integrity risk. In one further embodiment, in which mitigation includes use of one-plus-one protection, the post-mitigation data integrity risk may be computed taking into account the one-plus-one protection. In one embodiment, data integrity risk comprises at least one of data loss, data corruption, and the like that results from exposing a network element (Ei) to a disaster event (Dj). As depicted herein, pre-mitigation data integrity risk is computed as shown in Eq. 11A, post-mitigation data integrity risk is computed as shown in Eq. 11B, and post-mitigation data integrity risk (one-plus-one protection) is computed as shown in Eq. 11C:

$$Dbm_{(Ei,Dj)} = Dio_{(Ei,Dj)} * Pk_{(Ei,Dj)} \quad \text{(Eq. 11A)}$$

$$Dam_{(Ei,Dj)} = Dim_{(Ei,Dj)} * Pm_{(Ei,Dj)} \quad \text{(Eq. 11B)}$$

$$Dopo_{(Ei,Dj)} = Dam_{(Ei,Dj)} * (1 - oPo_{(Ei,Dj)}) \quad \text{(Eq. 11C)}$$

In one embodiment, the expected network impact is represented as a network disaster occurrence risk. In one embodiment, network disaster occurrence risk comprises the risk of a disaster strike to the entire network. In one such embodiment, the risk of a disaster strike to the network is computed as an average risk to the network elements in the network. In other words, the risk of a disaster strike to the network as a whole may be represented as an average of the risk of a disaster strike on each of the individual network elements of which the network is composed. In one further embodiment, the network disaster occurrence risk is computed using relative weights (i.e., the relative network element worth ($R_w$)) assigned to each of the network elements in the network. In one such embodiment, network disaster occurrence risk is computed as the risk of at least one occurrence of a disaster event Dj over T years, as shown in Eq. 12:

$$Risk_{Dj}(1+, T) = \frac{\sum_{i=1}^{N} Pd_{(Ei,Dj)}(1+, T) * Rw_{(Ei,Dj)}}{\sum_{i=1}^{N} Rw_{(Ei,Dj)}} \quad \text{(Eq. 12)}$$

Although described herein as the risk of a disaster strike to the entire network, in one embodiment, network disaster occurrence risk may comprise the risk of a disaster strike to a portion of a network. In one such embodiment, the portion of the network may comprise at least one geographical region, a network service, and like granularities, as well as various combinations thereof. In one such embodiment, the risk of a disaster strike to a portion of the network is computed as an average risk to the network elements in that portion of the network. For example, the risk of a disaster strike to a geographical region may be computed as an average risk to the network elements in the geographical region. Furthermore, although primarily described herein with respect to a network disaster occurrence risk for one disaster, in one embodiment, the network disaster occurrence risk may be computed for a plurality of disasters.

Figure 6A:
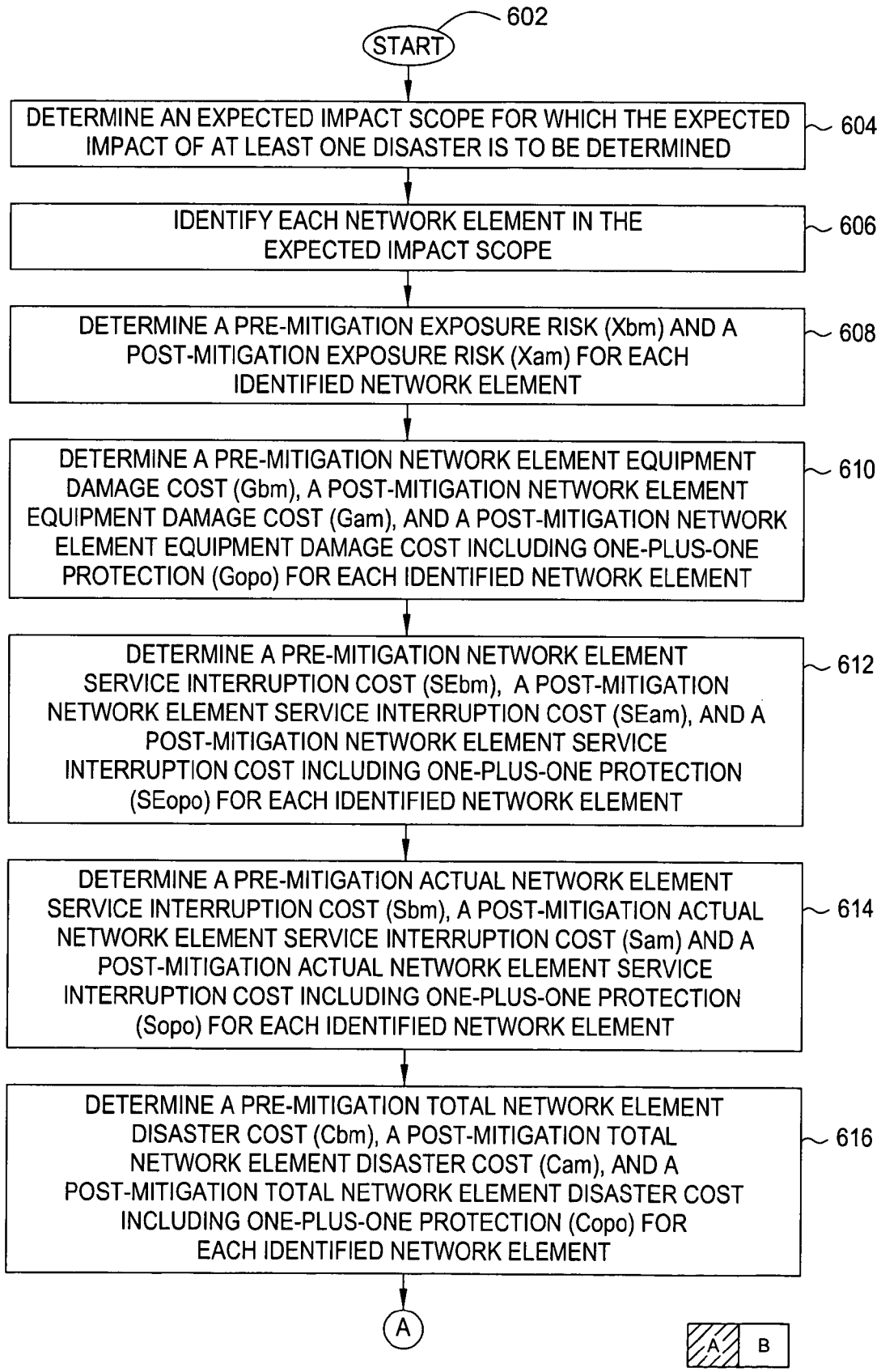
FIG. 6 depicts a flow diagram of a method according to one embodiment of the invention.
Figure 6B:
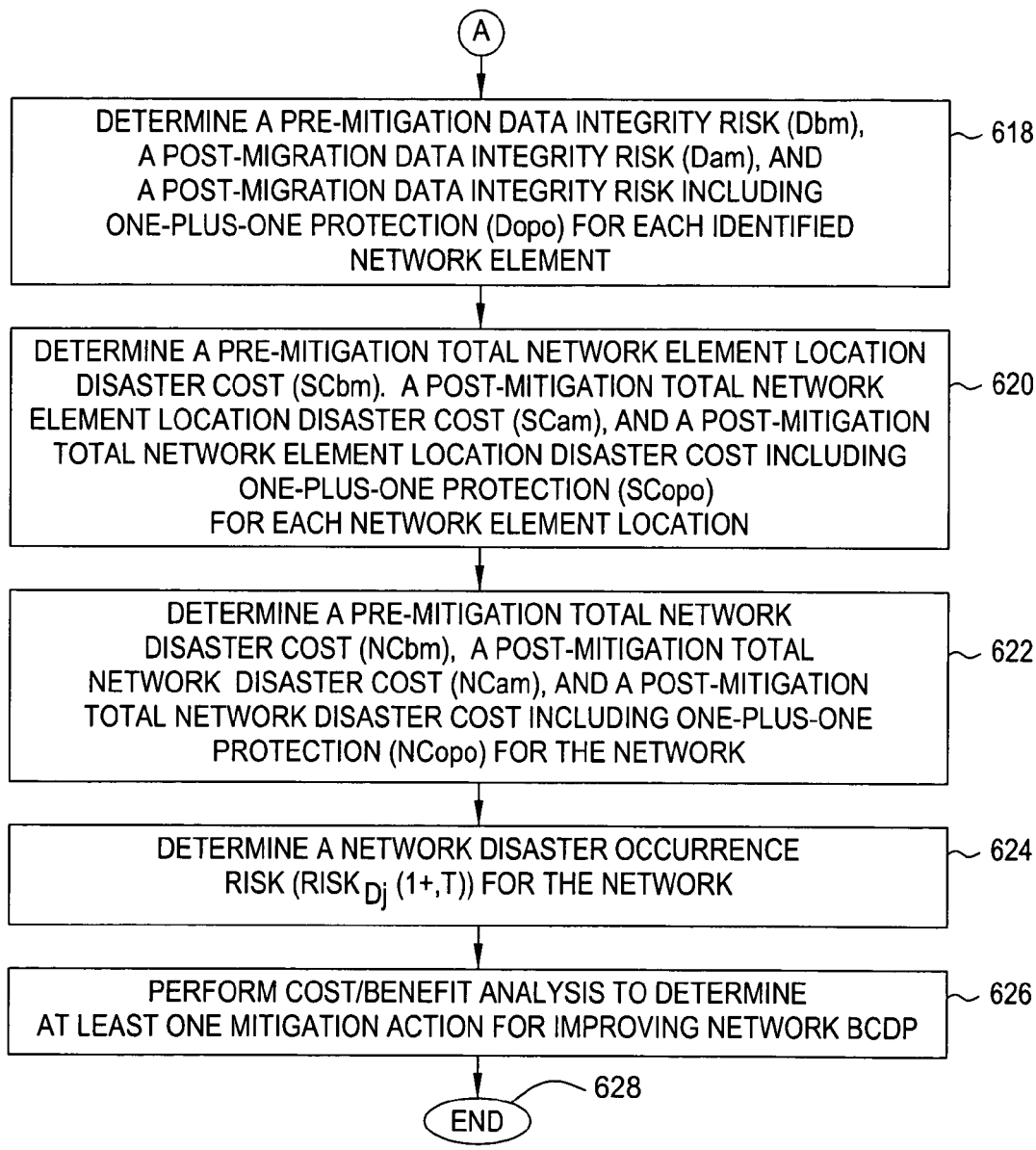

FIG. 6 depicts a flow diagram of a method according to one embodiment of the invention. Specifically, method 600 of FIG. 6 includes a method for determining an expected impact of at least one disaster on at least a portion of a communications network. Although the steps are depicted as being performed serially, those skilled in the art will appreciate that at least a portion of the steps of method 600 may be performed contemporaneously, as well as in a different order than presented in FIG. 6. The method 600 is entered at step 602 and proceeds to step 604.

At step 604, an expected impact scope is determined. In one embodiment, the expected impact scope is the scope for which at least one expected impact is to be determined. In one embodiment, expected impact scope comprises one of a network element, a group of network elements, a network element location, a group of network element locations, a network element location, a group of network element locations, an entire network, and the like, as well as various combinations thereof. In another embodiment, an expected impact scope may comprise a network service. In one such embodiment, the overall expected impact on the network service may be determined by determining the expected impact on each of the individual network elements required to provide that network service, and combining the expected impacts of the required network elements to produce an overall expected impact on the network service.

At step 606, each network element in the expected impact scope is determined. At step 608, a pre-mitigation exposure risk (Xbm) and a post-mitigation exposure risk (Xam) are determined for each identified network element. At step 610, a pre-mitigation network element equipment damage cost (Gbm), a post-mitigation network element equipment damage cost (Gam), and a post-mitigation network element equipment damage cost including one-plus-one protection (Gopo) are determined for each identified network element. At step 612, a pre-mitigation network element service interruption cost (SEbm), a post-mitigation network element service interruption cost (SEam), and a post-mitigation network element service interruption cost including one-plus-one protection (SEopo) are determined for each identified network element.

At step 614, a pre-mitigation actual network element service interruption cost (Sbm), a post-mitigation actual network element service interruption cost (Sam), and a post-mitigation actual network element service interruption cost including one-plus-one protection (Sopo) are determined for each identified network element. At step 616, a pre-mitigation total network element disaster cost (Cbm), a post-mitigation total network element disaster cost (Cam), and a post-mitigation total network element disaster cost including one-plus-one protection (Copo) are determined for each identified network element. At step 618, a pre-mitigation data integrity risk (Dbm), a post-mitigation data integrity risk (Dam), and a post-mitigation data integrity risk including one-plus-one protection (Dopo) are determined for each identified network element.

At step 620, a pre-mitigation total network element location disaster cost (LCbm), a post-mitigation total network element location disaster cost (LCam), and a post-mitigation total network element location disaster cost including one-plus-one protection (LCopo) are determined for each identified network element location. At step 622, a pre-mitigation total network disaster cost (NCbm), a post-mitigation total network disaster cost (NCam), and a post-mitigation total network disaster cost including one-plus-one protection (NCopo) are determined for the network. At step 624, a network disaster occurrence risk ($RISK_{Dj}(1+,T)$) are determined for the network.

At step 626, a cost-benefit analysis is performed to determine at least one mitigation action for improving business continuity disaster preparedness. By comparing pre-mitigation expected impact parameters and post-mitigation expected impact parameters, the expected benefits of various combinations of disaster mitigation actions may be analyzed. Furthermore, by comparing the associated costs of the various combinations of disaster mitigation actions, the expected benefits of the various combinations of disaster actions may be further analyzed in terms of both the expected benefits of the disaster mitigation actions, as well as the costs required to implement the disaster mitigation actions.

For example, consider a cost-benefit analysis of a natural disaster such as a lightening strike. In an analysis of lightening strikes, using the present invention, a pre-mitigation expected impact of lightening strikes on a particular portion of the network may be determined. In a region with a historically high lightening strike occurrence rate, a central office with a large number of network elements may have a large associated expected impact since a fire resulting from one of the frequent lightening strikes could result in a fire that destroys a large number of critical network elements. For example, a determination may be made that the disaster impact on the central office prior to any mitigation is an expected loss of $500,000.

Using the present invention, the disaster analysis may then be performed again with an assumption that lightening rods have been installed in the proximity of the central office building. In other words, a post-mitigation expected impact of lightening strikes on the central office may be determined. For example, a determination may be made that the disaster impact of on the central office after installation of lightening rods is $100,000. As such, assuming that the cost of the lightening rod installations is $20,000, the service provide is able to clearly determine that by spending $20,000 on disaster mitigation for that central office, the reduction in the probability that the disaster will impact the network elements associated with the central office results in a $400,000 reduction in the expected loss from such a disaster. The method 600 then proceeds to step 628, where method 600 ends.

Figure 7:
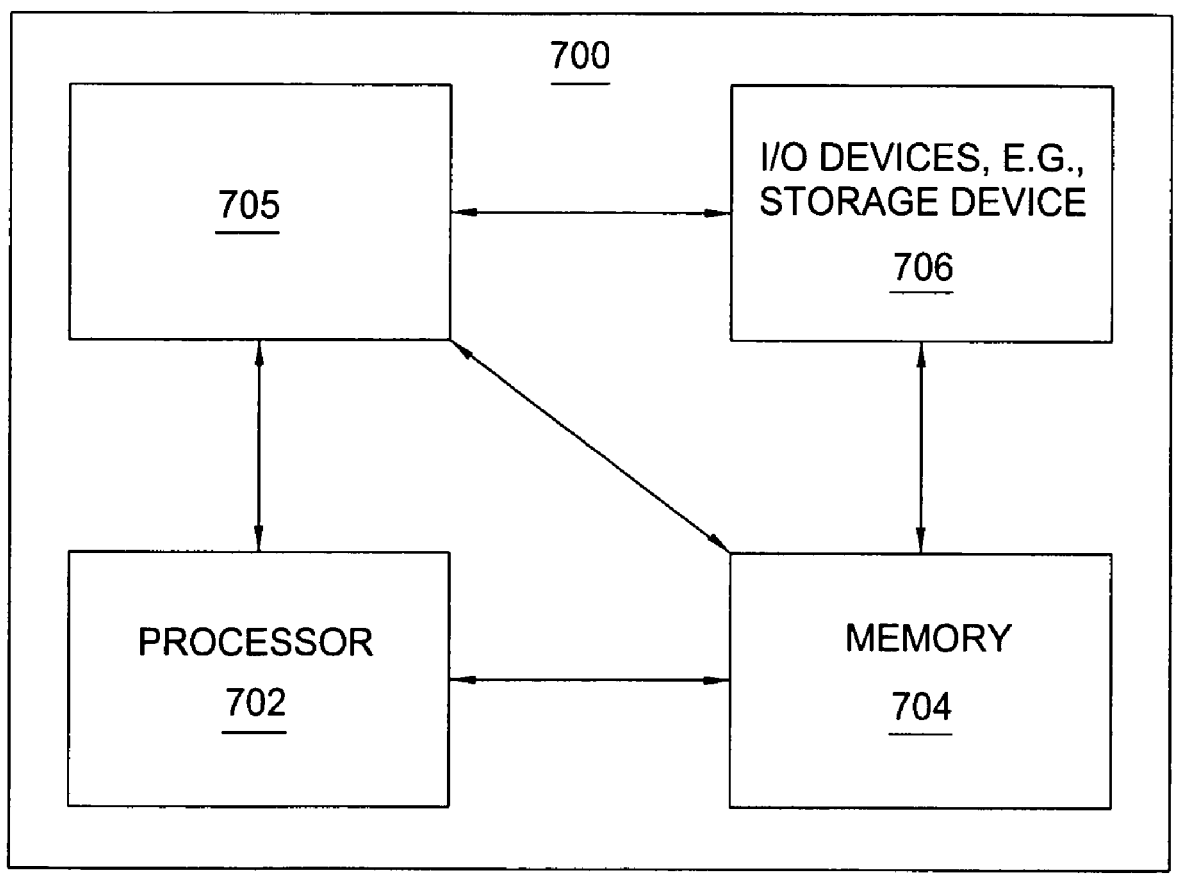
FIG. 7 depicts a high-level block diagram of a general-purpose computer suitable for use in performing the functions described herein.

FIG. 7 depicts a high level block diagram of a general purpose computer suitable for use in performing the functions described herein. As depicted in FIG. 7, system 700 includes a processor element 702 (e.g., a CPU), a memory 704, e.g., random access memory (RAM) and/or read only memory (ROM), a disaster analysis module 705, and various input/output devices 706 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present disaster analysis module or process 705 can be loaded into memory 704 and executed by processor 702 to implement the functions as discussed above. As such, the disaster analysis process 705 (including associated data structures) of the present invention can be stored on a computer readable medium or carrier, e.g., RAM memory, magnetic or optical drive or diskette and the like. In one embodiment, at least a portion of the disaster analysis model of the present invention may be stored in memory 704.

In one embodiment, the expected network loss over a given interval of time (T) is represented as a total expected network disaster loss. In one embodiment, the expected network disaster loss over a period of time is computed by computing the expected network disaster loss for each of the disasters and adding the computed expected network disaster loss for each of the disasters to obtain the total expected network disaster loss from all modeled disasters over the time interval (T). In one embodiment, the expected network loss from one disaster (Dj) is determined by computing the risk of occurrence of disaster (Dj) exactly once in the time interval (T) at every physical site in the network and multiplying the risk of occurrence of disaster (Dj) by the expected impact of disaster (Dj) on the respective physical sites.

This process for determining the expected network loss from one disaster (i.e., the impact of the disaster occurring once in time interval (T)) is then repeated for each physical site in the network for each possible number of disaster occurrences in the time interval (T). For example, the process is repeated for the impact of the disaster occurring twice in the time interval, for the impact of the disaster occurring three times in the time interval, and so on until the computation converges and the number is low compared to the cumulative total at each of the physical sites. Then, by adding all of the cumulative totals at all of the sites, an expected network loss from disaster (Dj) over time interval (T) is determined. In one further embodiment, the analysis is repeated over various time intervals in order to determine the length of time required to realize savings from certain mitigation actions in relation to the cost required to implement the mitigation actions.

Although not depicted or described herein, in one embodiment, the methodologies of the present invention may be utilized for determining the impacts of various combinations of disasters on networks other than communications networks. For example, the methodologies of the present invention may be utilized for determining the impacts of various combinations of disasters on power delivery networks, water delivery networks, financial transaction network, and the like, as well as various combinations thereof.

Although various embodiments that incorporate the teachings of the present invention have been shown and described in detail herein, those skilled in the art can readily devise many other varied embodiments that still incorporate these teachings.

What is claimed is:

1. An apparatus for analyzing a network, comprising:
    a memory; and
    a processor adapted, upon receiving instructions from the memory, to execute a method comprising:
        modeling the network as a plurality of geographical regions associated with respective pluralities of network elements and network element interconnectivities to create a network model;
        generating a disaster model associated with a disaster by adjusting a disaster framework using a disaster parameter associated with the disaster, wherein the disaster framework is selected based on the disaster;
        generating a disaster analysis model using the network model and the disaster model, the disaster analysis model including a disaster probability parameter and a disaster impact parameter; and
        determining an expected impact of the disaster on at least a portion of the network using the disaster analysis model.

2. The apparatus of claim 1, wherein the plurality of geographical regions associated with the respective pluralities of network elements and network element interconnectivities is determined according to the disaster.

3. The apparatus of claim 1, wherein the modeling the network further comprises:
    identifying at least one network element location having at least one network element;
    associating each identified network element location with one of the plurality of geographical regions; and
    associating at least one geographical characteristic with each network element within each identified network element location.

4. The apparatus of claim 1, wherein:
    the disaster framework is selected according to a disaster category associated with the disaster; and
    the disaster parameter comprises at least one disaster statistic associated with the disaster.

5. The apparatus of claim 1, wherein:
    the modeling the network comprises:
        partitioning the network into the plurality of geographical regions according to a disaster type associated with the disaster, wherein each geographical region includes at least one network element location including at least one network element; and
    the method further comprises:
        identifying, using the network model, at least one geographical characteristic associated with each network element location;
        applying the disaster model to each network element according to its identified geographical characteristic; and
        determining, for each network element, the disaster probability parameter and the disaster impact parameter.

6. A computer readable medium storing a software program, that, when executed by a computer, causes the computer to perform a method comprising:
    modeling the network as a plurality of geographical regions associated with respective pluralities of network elements and network element interconnectivities to create a network model;
    generating a disaster model associated with a disaster by adjusting a disaster framework using a disaster parameter associated with the disaster, wherein the disaster framework is selected based on the disaster;
    generating a disaster analysis model using the network model and the disaster model, the disaster analysis model including a disaster probability parameter and a disaster impact parameter; and
    determining an expected impact of the disaster on at least a portion of a network using the disaster analysis model.

7. The computer readable medium of claim 6, wherein the plurality of geographical regions is determined according to the disaster.

8. The computer readable medium of claim 6, wherein the modeling the network comprises:
    identifying at least one network element location having at least one network element;
    associating each identified network element location with one of the plurality of geographical regions; and
    associating at least one geographical characteristic with each network element within each identified network element location.

9. The computer readable medium of claim 6, wherein
    the disaster framework is selected according to a disaster category associated with the disaster; and
    the disaster parameter comprises at least one disaster statistic associated with the disaster.

10. The computer readable medium of claim 6, wherein:
    the modeling the network comprises:
        partitioning the network into the plurality of geographical regions according to a disaster type associated with the disaster, wherein each geographical region includes at least one network element location including at least one network element; and
    the method further comprises:
        identifying, using the network model, at least one geographical characteristic associated with each network element location;
        applying the disaster model to each network element according to its identified geographical characteristic; and
        determining, for each network element, the disaster probability parameter and the disaster impact parameter.

11. The computer readable medium of claim 10, wherein the disaster probability parameter comprises a disaster occurrence probability.

12. The computer readable medium of claim 11, wherein the determining of the disaster occurrence probability comprises:
    determining a disaster occurrence rate, wherein the disaster occurrence rate comprises a rate of occurrence of the disaster in at least a portion of the geographical region associated with the network element;

determining a network element location impact probability, wherein the network element location impact probability comprises a probability of the disaster directly impacting the network element location associated with the network element; and determining the disaster occurrence probability using the disaster occurrence rate and the network element location impact probability.

13. The computer readable medium of claim 12, wherein the expected impact comprises an exposure risk, the exposure risk comprising a probability of exposure of the network element to the disaster, wherein the exposure risk is determined using the disaster occurrence probability and a network element damage probability.

14. The computer readable medium of claim 12, wherein the expected impact comprises a network disaster occurrence risk, the network disaster occurrence risk computed using a disaster occurrence probability and a network element relative worth indicator associated with the network element.

15. The computer readable medium of claim 10, wherein the disaster probability parameter comprises a network element damage probability.

16. The computer readable medium of claim 15, wherein the determining the network element damage probability comprises:

determining a first disaster occurrence probability associated with a first network location; and determining the network element damage probability using the first disaster occurrence probability.

17. The computer readable medium of claim 16, wherein the determining the network element damage probability further comprises:

determining a second disaster occurrence probability associated with a second network location by adjusting the first disaster occurrence probability, wherein the second network location is located within the first network location; and modifying the network element damage probability using the second disaster occurrence probability.

18. The computer readable medium of claim 15, wherein the expected impact comprises a network element equipment damage cost, the network element equipment damage cost computed using the network element damage probability, a permanent equipment damage parameter, and a network element replacement cost.

19. The computer readable medium of claim 15, wherein the expected impact comprises a network element service interruption cost, the network element service interruption cost computed using the network element damage probability, a service interruption cost, a network element service interruption indicator, and a network element mean-time-to-repair parameter.

20. The computer readable medium of claim 19, wherein the expected impact comprises an actual network element service interruption cost, the actual network element service interruption cost comprising a maximum of the network element service interruption cost for each network element in a logical site.

21. The computer readable medium of claim 15, wherein the expected impact comprises a network element disaster cost, the network element disaster cost comprising a network element equipment damage cost and an actual network element service interruption cost.

22. The computer readable medium of claim 21, wherein the network element equipment damage cost is computed using the network element damage probability, a permanent equipment damage parameter, and a network element replacement cost.

23. The computer readable medium of claim 21, wherein the actual network element service interruption cost comprises a maximum of a network element service interruption cost for each network element in a logical site, the network element service interruption cost computed using the network element damage probability, a service interruption cost, a network element service interruption indicator, and a network element mean-time-to-repair parameter.

24. The computer readable medium of claim 6, wherein the expected impact comprises a data integrity risk, the data integrity risk computed using the network element damage probability and a data integrity loss probability.

25. The computer readable medium of claim 6, wherein the method further comprises:

computing an expected loss value for the network over a plurality of time intervals; and analyzing the expected loss value associated with each of the plurality of time intervals for assessing at least one mitigation action.

26. The computer readable medium of claim 6, wherein the method further comprises:

determining a pre-mitigation expected impact using a pre-mitigation disaster probability parameter and a pre-mitigation disaster impact parameter from the disaster analysis model;

determining a post-mitigation expected impact using a post-mitigation disaster probability parameter and a post-mitigation disaster impact parameter from the disaster analysis model; and performing a cost-benefit analysis of at least one mitigation using the pre-mitigation expected impact and the post-mitigation expected impact.

27. A computer readable medium storing a software program, that, when executed by a computer, causes the computer to perform a method for generating a disaster analysis model for a network, comprising:

for each of one or more disasters;

modeling the network as a plurality of geographical regions determined based on the disaster, each geographical region including one or more of a plurality of network elements of the network;

determining, for at least one of the plurality of network elements, at least one disaster probability parameter representing a likelihood of the disaster impacting the at least one of the plurality of network elements;

determining, for the at least one of the plurality of network elements, at least one disaster impact parameter representing a likely impact of the disaster if the disaster strikes the at least one of the plurality of network elements, wherein at least one of the at least one disaster probability parameter and the at least one disaster impact parameter is determined using a geographical characteristic associated with a geographical region of the at least one of the plurality of network elements; and updating the disaster analysis model by forming a model entry associated with the disaster for each of the at least one of the plurality of network elements, the model entry including the at least one disaster probability parameter and the at least one disaster impact parameter associated with the network element and the disaster.

* * * * *

UNITED STATES PATENT AND TRADEMARK OFFICE
CERTIFICATE OF CORRECTION

PATENT NO. : 7,603,259 B2  Page 1 of 1
APPLICATION NO. : 11/238919
DATED : October 13, 2009
INVENTOR(S) : Jrad et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 721 days.

Signed and Sealed this

Fifth Day of October, 2010

David J. Kappos
*Director of the United States Patent and Trademark Office*